US011146598B1

(12) United States Patent
Palihakkara et al.

(10) Patent No.: US 11,146,598 B1
(45) Date of Patent: Oct. 12, 2021

(54) ESTABLISHING A BOT-TO-BOT COMMUNICATION PROTOCOL

(71) Applicant: Amazon Technologies, Inc., Seattle, WA (US)

(72) Inventors: Sahan Palihakkara, Seattle, WA (US); Rami Yampolsky, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/113,191

(22) Filed: Dec. 7, 2020

(51) Int. Cl.
G06F 15/16 (2006.01)
H04L 12/58 (2006.01)
G06F 40/58 (2020.01)
H04L 29/06 (2006.01)

(52) U.S. Cl.
CPC .......... *H04L 65/1069* (2013.01); *H04L 51/02* (2013.01); *H04L 51/066* (2013.01); *H04L 51/18* (2013.01); *H04L 51/32* (2013.01)

(58) Field of Classification Search
CPC ... H04L 65/1069; H04L 51/066; H04L 51/32; H04L 51/02; H04L 51/18
See application file for complete search history.

(56) References Cited

U.S. PATENT DOCUMENTS

| 11,018,998 | B1 * | 5/2021 | Knas | H04L 51/04 |
| 2019/0166071 | A1 * | 5/2019 | Lim | H04L 51/02 |
| 2019/0370629 | A1 * | 12/2019 | Liu | G06F 40/30 |
| 2020/0073999 | A1 * | 3/2020 | Zucker | H04L 51/02 |

* cited by examiner

*Primary Examiner* — Soe Hlaing
(74) *Attorney, Agent, or Firm* — Lee & Hayes, P.C.

(57) ABSTRACT

Systems and methods allow bots to collaborate using a bot-to-bot communication protocol. In some instances, a first bot may request to establish a bot-to-bot channel with a second bot. The first bot may be authorized to issue the request for establishing the bot-to-bot channel. To communicate with one another, the first bot may have a first application programming interface (API) that is configured to communicate over the bot-to-bot channel with the second bot in natural language Additionally, the second bot may have a second API configured to communicate over the bot-to-bot channel with the first bot in natural language. An invitation to be sent to the second bot associated with joining the bot-to-bot channel. If accepted, the first bot and the second bot may exchange messages over the bot-to-bot channel.

20 Claims, 10 Drawing Sheets

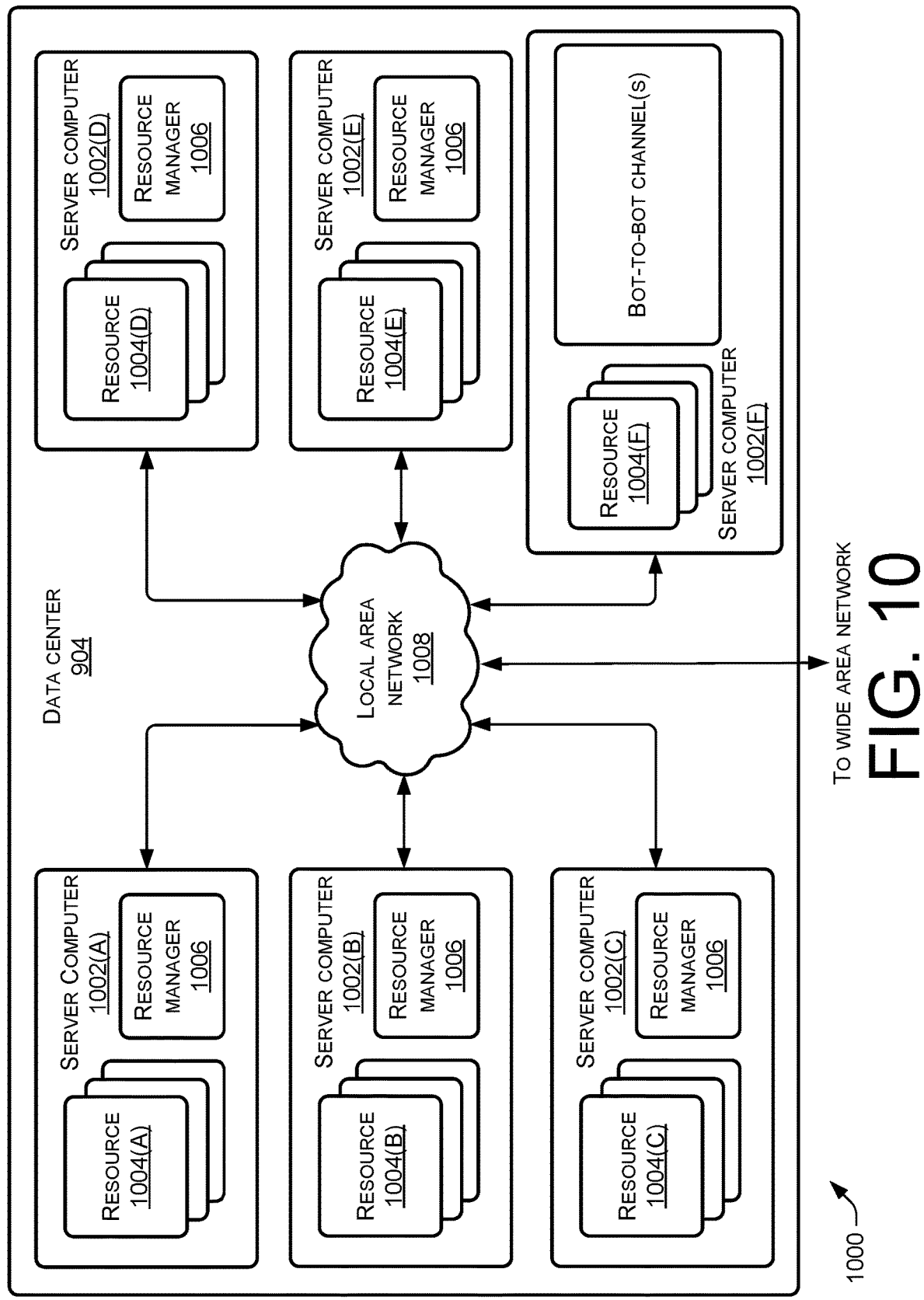

ESTABLISHING A BOT-TO-BOT COMMUNICATION PROTOCOL

BACKGROUND

Internet bots, web robots, robots, or bots are automated programs or applications designed to perform a specific task. Bots are automated according to their programmed instructions and are capable of completing tasks at a much higher rate compared to human activity. For example, bots may respond to customer queries (e.g., weather, order status, etc.), schedule events, set alarms or reminders, transmit content (e.g., news), and so forth.

One specific type of bot is a chatbot that simulates human conversation in customer service environments and/or messaging applications. The automation and rule-based approach with which chatbots are designed limits their functionality and/or tasks they are capable of performing. For example, when chatbots cannot answer a customer query, they may seek assistance of human representatives. This, however, introduces delays, response times, and leads to decrease usage.

One way to increase the usability of bots is to allow bots to communicate with one another. Getting two or more bots to communicate with one another is difficult in today's fragmented chatbot industry. For example, communication channels have proprietary protocols that prevent bot(s) on one channel (or service) communicating with bot(s) on another channel (or service). Barriers also exist for bots on the same channel as these channels are typically designed to allow human to bot conversations and not bot-to-bot conversations. As a result, bot creators often attempt to expand the functionality of bots to handle increase workloads and/or respond to a multitude of tasks. However, this is a complex, iterative, resource-intensive, and time-consuming process.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items.

FIG. 10 illustrates an example computing system diagram showing a configuration for a data center that may be utilized to implement aspects of the technologies disclosed herein, according to an embodiment of the present disclosure.

DETAILED DESCRIPTION

Figure 1:
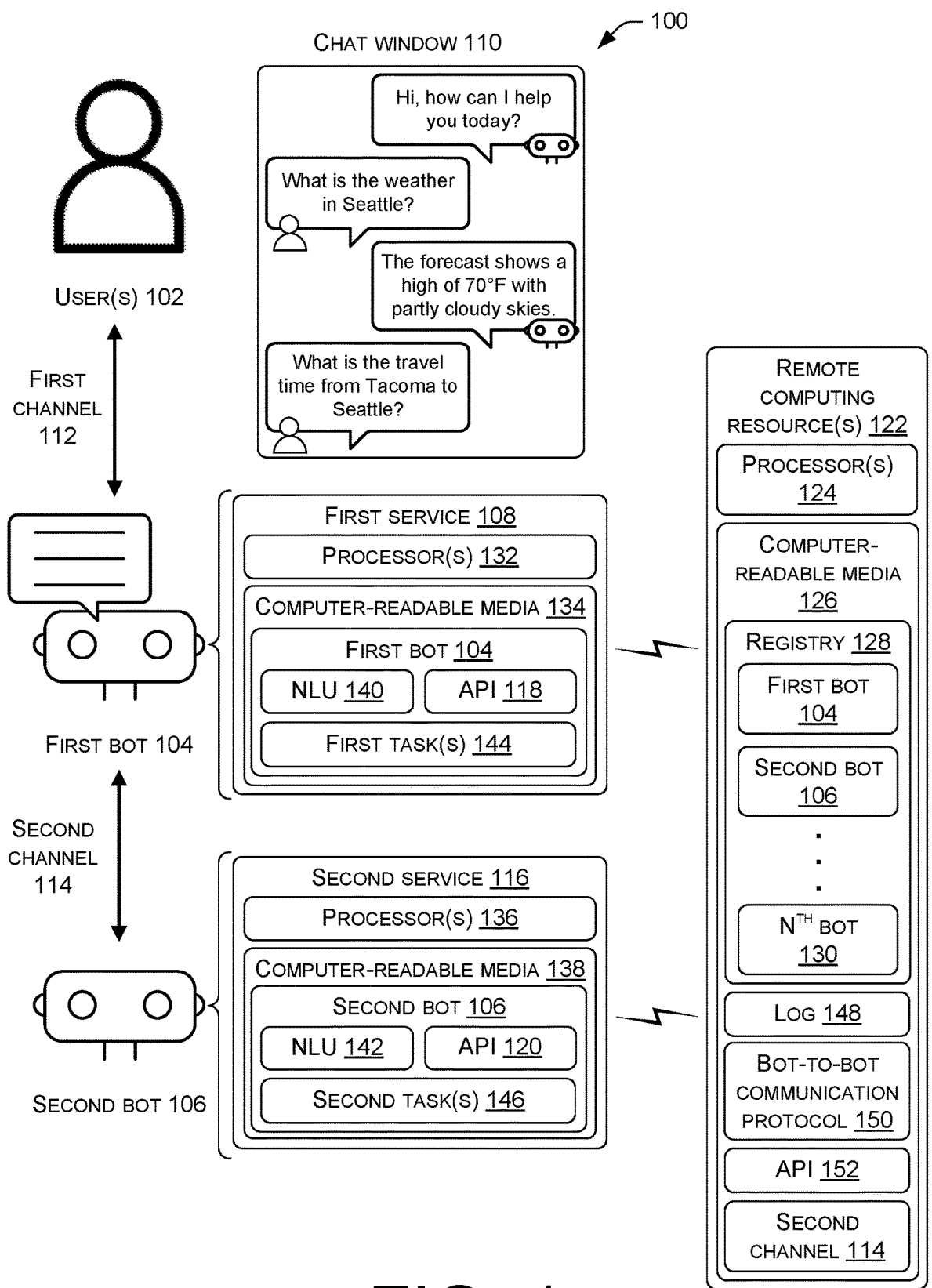
FIG. 1 illustrates an example environment in which bots may collaborate with one another over a bot-to-bot channel, according to an embodiment of the present disclosure. In the example shown in FIG. 1, a user may communicate with a first bot for various purposes and the first bot may provide assistance to the user, such as scheduling events, responding to user queries, and so forth. In some instances, the first bot may communicate with a second bot over the bot-to-bot channel for purposes of providing assistance to the user. The first bot and the second bot may collaborate to fulfill requests or otherwise provide assistance to the user.

Described herein are, among other things, systems and methods that establish bot-to-bot communication channel for allowing bots on messaging channels (e.g., Slack®, Facebook® Messenger, WhatsApp®, etc.) to talk with one another via a common application program interface (API). The bots, or other platforms and/or systems, may create a secure bot-to-bot channel and invite other bots into the channel for purposes of collaborating with one another and responding to user inquiries. While traditional messaging channels are used to connect bots and users (e.g., humans), the bot-to-bot channel exists outside of these channels and connects bots with other bots. In some instances, the bot-to-bot channel may also include human advisors (e.g., bot creators) that moderate or oversee the bot-to-bot channel. Bots and/or bot creators may accept invites to join the bot-to-bot channel. In some instances, within the bot-to-bot channel, messages are exchanged in natural language. In some instances, these messages are exchanged publicly (visible to all bots and/or bot creators in the channel) or exchanged privately (visible to a defined list of bots and/or bot creators in the channel). Using the bot-to-bot channel the bot(s) and/or bot creator(s) may collaborate with one another and once a collaborative solution is reached, the solution may be passed onto the user. In some instances, a bot that is engaging with the user and/or which requested the bot-to-bot channel may respond to the user. A message history of the bot-to-bot channel is available to participants of the bot-to-bot channel for auditing and analytic purposes to improve bot behavior and performance.

Bots are developed to carry out specific tasks and/or respond to certain queries. The bots are specialized and trained to handle certain requests as programmed and designed by the bot creators. Given that bot(s) are inherently limited by the tasks they are programmed to perform, the bots may communicate with one another for collaboratively assisting users. However, because of today's fragmented bot industry, challenges arise in getting two bots to communicate with one another. For example, bots often have specific proprietary protocols or frameworks that prevent them from communicating across channels (e.g., applications). That is, bot(s) developed by a first bot creator may be incapable of communicating with bot(s) developed by a second bot creator. Some bot builder frameworks allow bots to communicate with each other as long as the bots are built using the dedicated frameworks. However, bots built using one framework may not be able to communicate with bots built by another framework. In such instances, bot(s) on separate platforms and/or applications, or bot(s) built on different frameworks may not communicate and be incapable of collaborating. Even more so, bots on the same channel (or platform) may experience similar trouble because channels are typically designed for human to bot conversations. Moreover, even two bots developed by the same bot creator may be unable to communicate with one another, such as a first bot of a first type and a second bot of a second, different type.

Opening communication between bots require that the bot creators agree on custom APIs to exchange messages. For example, a custom API may be developed to permit bot(s) developed by the first bot creator to communicate with bot(s) developed by the second bot creator. This solution is not scalable because new APIs will have to be agreed upon and individually created.

Alternatively, the bot-to-bot communication protocol allows the bots to collaborate with each other by standardizing the way in which bots communicate. In doing so, a team of bots with varying degrees of specialization and complexity may collaborate with one another to solve more problems for users than any individual bot may perform on its own. Bot creators may therefore expand bot functionality through utilizing the resources and knowledge of other bot(s).

The bot-to-bot communication protocol enables cross-channel communication (i.e., between different bot creator(s), applications, platforms, etc.) to provide the ability to mix-and-match bots on demand and offer new functionality. For example, consider an instance where a bot receives a query that it cannot answer or which the bot is not programmed to answer. Instead of returning an error message, or forwarding the query onto a bot creator and/or human representative, the bot may confer with other bots. As another example, a service offered by a bot may be made available in multiple languages by inviting a bot that translates messages into multiple languages. Through this collaboration, bot creators may focus on training their bots do a few things really well, instead of attempting to program the bots to cover a broad spectrum. As needs arise, the bot creators may elastically scale the capabilities of their bot by simply communicating with other bots on additional channels at any time.

The bot-to-bot communication protocol may leverage natural language, natural language understanding (NLU), and/or natural language processing (NLP). For example, the bots may communicate using natural language to provide a standardized method of communication between bots. This may eliminate the need to develop custom APIs for enabling two or more bots to communicate. Instead, by using natural language as the bot-to-bot communication protocol, bot creators may onboard a bot-to-bot API once to integrate this within their bot(s). In some instances, the bot-to-bot communication protocol may be bot builder framework and/or channel agnostic. As long as the bot(s) and/or bot creator(s) adhere to API, the bot(s) may be able to talk to one another. The bot(s) have respective APIs that allow them to communicate with one another, infer intent, and determine meaning behind communications. The bot creators may configure the APIs of their bots to communicate via natural language or to be able to infer natural language. Using natural language as a way to communicate avoids bot creators having to understand the API belonging to each bot that partakes in a collaborative environment. Instead, by using natural language the systems and methods disclosed herein perform the same function as these specialized APIs but provide more flexibility and scalability.

Those bot(s) that are able to communicate via the bot-to-bot communication protocol may be registered or recorded within a registry. In some instances, all of the bot(s) registered within the directory may be capable of communicating via natural language, whereby their respective APIs are programmed to make appropriate calls for transmitting messages in natural language as well as using NLU/NLP to decipher intent and meaning behind natural language messages. The registry may provide a database of those bot(s) as well as their capabilities, specialties, and/or performable tasks. Storing the bot(s) in this manner allows other bot(s) and bot creator(s) to find one another. That is, the bot(s) and/or bot creator(s) may search or browse registry to find other bots with which to collaborate or engage. The registry may therefore serve as an accurate database that identifies those bot(s) capable of collaboration via natural language and have an API configured to communicate via natural language. The registry and/or the bot-to-bot communication protocol may introduce standards that allow bots to specify what intents they are configured to handle or what customer utterances, commands, etc. they are capable of recognizing to find bots to collaborate with. In some instances, the bots may annotate natural language queries from users to help bot(s) understand intent.

In some instances, bot(s) may initiate collaborations with other bot(s) and/or bot creator(s) in response to user inquiries or as a way to provide user assistance. For example, envision that a user and a first bot, such as a chatbot, are communicating about the status of an order via an application. The user may engage with the chatbot via a chat window and may ask the chatbot "What is the status of my order?" Here, the chatbot may be programmed and trained to identify the user, the order of the user, and return the status of the order. Upon outputting the response, the user may ask an additional question or have a follow-up request, such as "Please set a reminder in my calendar when my order is scheduled to arrive." Alternatively, the chatbot may automatically be programmed to surface an output based on the inquiry of the user. For example, the chatbot may output a question "Would you like me to set a reminder in your calendar?" Here, the chatbot may identify associated tasks or further assistance that may be of help to the user. In this example, the chatbot may be trained to respond to user inquiries concerning order status but may not be trained and programmed to set reminders in a calendar. Instead of returning an error message, or directing the user other applications for setting a reminder, the chatbot may collaborate with a second bot for purposes of setting a reminder. In this example, the second bot may be trained and programmed to set reminders for the user. The chatbot may locate the second bot via the registry or through previous interactions. For example, the bot creator of the chatbot may have previously programmed the chatbot to utilize the second bot for setting calendar reminders. Moreover, the interaction between the chatbot and the second bot may serve to authenticate the user with the second bot.

In some instances, remote computing resource(s) may host or establish the bot-to-bot channel between two or more bot(s). The remote computing resource(s) may be a third-party service utilized by the chatbot (or the first bot creators) and/or the second bot (or the second bot creators) for communicating with other bot(s). For example, in the event that the chatbot seeks to communicate with other bot(s), such as the second bot, the chatbot may transmit a request to the remote computing resource(s). To communicate with the chatbot and the second bot, the remote computing resource(s) may have a corresponding API. To communicate with one another, the remote computing resource(s) may receive a request from the chatbot and send an invitation to the second bot to join a bot-to-bot channel in which the chatbot and the second bot communicate. In this scenario, the remote computing resource(s) may host the bot-to-bot channel and transmit (e.g., forward) message(s) between the chatbot and the second bot. The remote computing resource(s) may determine that the chatbot and the second bot are able to communicate with the remote computing resource(s) using appropriate APIs. Upon receipt of the invitation, the second bot may choose to accept or reject the invitation to the channel. For example, in certain instances, bot creator(s) may not desire their bot(s) to communicate with other bot(s) or communicate with bot(s) of a certain bot creator. In instances where the second bot accepts the invite, the remote computing resource(s) may receive the request and the chatbot and the second bot may communicate over the bot-to-bot channel.

Once the bot-to-bot channel is established, the chatbot may transmit a message to the remote computing resource(s) associated with asking the second bot to set a reminder in the calendar of the user. Therein, the remote computing resource(s) may forward the message to the second bot. In some instances, the remote computing resource(s) may also receive additional information from the chatbot forwarding to the second bot. In some instances, this information may include order status, projected delivery time/date, etc. Once a reminder is set, the second bot may communicate this to the remote computing resource(s) and the remote computing resource(s) may forward an indication to the chatbot. Once the inquiry of the user has been resolved the bot-to-bot channel may terminate. Alternatively, the bot-to-bot channel between chatbot and the second bot may remain open for assisting the user or additional users. As such, the remote computing resource(s) may act as a middleman or interface between the chatbot and the second bot.

As alluded to above, the bot-to-bot channel may be hosted by the computing resource(s). As part of this, the service(s) associated with the chatbot and/or the second bot may utilize the remote computing resource(s) for establishing and hosting the bot-to-bot channel, as well as permitting the chatbot and the second bot to communicate. In some instances, the remote computing resource(s) may also host the registry. By having access to the registry and those bot(s) that are permitted to collaborate, the remote computing resource(s) may host the bot-to-bot channel(s) to allow collaborations between the bot(s).

In some instances, the communication over the bot-to-bot channel may occur in natural language. Exchanging human-readable messages preserves conversation context and transparency and allows bot creator(s) to audit or otherwise interact within the channels. For example, bot creators may oversee conversations to further train and/or program the bots. Additionally, being as the conversation occurs in natural language, bot creator(s) may understand the messages, context, and communications between the bot(s) in order to train, guide, or serve as moderators within the bot-to-bot channel. In such instances, the bot creator(s) may communicate within the channel and such communications may be interpreted and understood by the other bot(s). This intervention may be critical in the configuring, training and optimizing the collaboration amongst bots. Additionally, a log or history of the bot-to-bot channel may be recorded and stored. However, in some instances, the bot(s) may exchange non-human readable language. For instance bots may include authorization tokens or encrypted information in the hypertext transfer protocol (HTTP) header of messages.

Using NLU provides a mechanism that is easier to adopt to allow bots to communicate and collaborate, as compared to generating custom APIs (on a per-bot basis) that open communication between bots. Compared to conventional bots that have custom APIs, the system and methods disclosed herein utilize a common API for universal message exchange. In other words, traditionally each bot has a custom API with custom data exchange standards. As a result, there is currently no universal message exchange API that bots use to communicate with one another. The establishment of a common communication standard secures collaborations, eliminates managing complex one-time integrations with other bots, and provides access to audit message history. This also allows bots and bot creators to extend the functionality of their bots by delegating work to other bots instead of building the functionality themselves. Moreover, the collaboration between the bot(s) allows for verification and authentication of user amongst bot(s).

The present disclosure provides an overall understanding of the principles of the structure, function, device, and system disclosed herein. One or more examples of the present disclosure are illustrated in the accompanying drawings. Those of ordinary skill in the art will understand and appreciate that the devices, the systems, and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

FIG. 1 illustrates an example environment 100 in which bot(s) collaborate to resolve issues, conflicts, questions, or otherwise provide assistance to users. For example, the environment 100 may include a user 102, a first bot 104, and a second bot 106. As shown in FIG. 1, the user 102 may communicate with the first bot 104. The first bot 104 may be associated with a first service 108 that provides services or assistance to the user 102. The first bot 104 may be an application operating on a device of the user 102 and may provide the user 102 with a service of the first service 108.

In some instances, the first bot 104 may represent a chatbot that performs automated tasks on behalf of the first service 108, or as programmed and/or instructed by the first service 108. For example, the first bot 104 may perform automated tasks by chatting with humans, such as the user 102, through a chat window 110. In some instances, the first bot 104 may use predefined scripts that are capable of handling simple and specific questions of the user 102. For example, in FIG. 1 the user 102 is shown asking the question "What is the weather today in Seattle?" In some instances, advanced bots may leverage artificial intelligence (AI) and have the ability to learn and adapt over time to requests of the user 102 and/or to predict intent of the requests.

The first bot 104 may be developed by bot creators and/or bot developers of the first service 108. In some instances, the bot creators may use bot builder frameworks (e.g. Lex, Pandorabots, and Gupshup) to create the first bot 104. The bots of the first service 108, such as the first bot 104, may operate in channels. These channels may be applications (e.g., Viber®, Telegram®, WhatsApp®, etc.), websites (e.g., Facebook® Messenger), and/or smart devices (e.g., Alexa). Additionally, the bots may be used in online chat sessions, using voice assistants, etc. The bots use these channels to interact with end users in human-conversational language. For example, as shown in FIG. 1, the first bot 104 may use a first channel 112 to interact with the user 102. In some instances, the first service 108, using the bot builder framework, may publish or make the first bot 104 available to multiple channels (i.e., to multiple applications) and/or to a single channel (e.g., the first channel 112). In these channels, the first bot 104 may communicate with the user 102.

The first bot 104 may be in communication with one or more additional chatbot(s), such as the second bot 106 using additional channel(s). The additional channel(s) may generally represent or correspond to a medium that connects two entities, such as the first bot 104 and the second bot 106. The channel may connect bots on two different applications. In some instances, the channel may be requested or established by the first bot 104 for communicating with the second bot 106 (or additional bot(s)). Additionally, the first bot 104 may collaborate or engage with remote computing resource(s) 122 for communicating with the second bot 106. For example, the first bot 104 may transmit, to the remote computing resource(s) 122, a request to establish a second channel 114 for interacting with the second bot 106. The initiating bot that requests or initiates channel(s) with other bot(s) may be considered an administrator. In the example discussed in FIG. 1, as the first bot 104 may initiate communication with the second bot 106, the first bot 104 may be considered the administrator of the second channel 114. Being an administrator provides the first bot 104 with certain privileges, such as inviting other bot(s) into the second channel 114, removing other bot(s) from the second channel 114, terminating the second channel 114, and/or posting to the second channel 114.

The establishment of the second channel 114 by the remote computing resource(s) 122 allows the first bot 104 and the second bot 106 to communicate and collaborate with one another to share their expertise or the specific set of tasks that they are designed to perform. For example, as each bot may be trained to handle a limited set of queries, or handle a limited set of inquiries, tasks, and so forth, the first bot 104 and the second bot 106 may have respective fields of expertise. In some instances, by collaborating with one another a team of bots, each with varying degrees of specialization, may solve more problems and perform more tasks than any individual bot could perform on its own.

Consider a scenario whereby the first bot 104 receives a question from the user that the first bot 104 cannot answer or is not programmed to answer. The first bot 104, noted above, may be programmed to handle questions or queries related to the weather but may not be programmed to respond to queries unrelated to weather. For example, the first bot 104 may receive a question unrelated to the weather, such as "What is the travel time from Tacoma to Seattle?" In this example, the first bot 104, and/or the first service 108, may not be designed to handle this question. Instead of returning an error message the first bot 104 may confer with other bots and return an answer to the user. For example, the first bot 104 may confer with the second bot 106 over the second channel 114 established by the remote computing resource(s) 122. In this example, the second bot 106 may be programmed to field questions relating to travel and may return a response to the first bot 104 for forwarding to the user 102. This response, as compared to returning an error message, may provide improved user experiences and increase an engagement/use of the user 102 with the first bot 104.

The second channel 114 through which the first bot 104 and the second bot 106 communicate may be considered a bot-to-bot channel that allows the bots to communicate. Within the second channel 114 the first bot 104 and the second bot 106 may exchange messages. Additionally, the remote computing resource(s) 122 may serve as an interface between the first bot 104 and the second bot 106 by forwarding messages between the first bot 104 and the second bot 106. These messages may represent or correspond to human-readable messages. Exchanging human-readable messages preserves a conversation context and transparency and allows bot creators to review, audit, or otherwise interact within the second channel 114. For example, bot creators may audit conversations to further train and/or program the first bot 104 and/or the second bot 106, respectively. Additionally, in some instances, the bot creator(s) may be added into the second channel 114 to act as moderators to guide the conversation and/or resolve conflicts.

In some instances, the second channel 114 may be considered a chatroom within which the first bot 104 and the second bot 106 are able to communicate. The bot creator(s), the first bot 104, and/or the second bot 106 are able to request that the be created to invite other bot(s). For example, as explained herein, in the example of FIG. 1, the first bot 104 may transmit a request to the remote computing resource(s) 122 for establishing the second channel 114 and inviting the second bot 106.

Allowing the first bot 104 and/or the second bot 106 to collaborate within the second channel 114 permits an increased spectrum of queries and performable tasks, particularly in AI and/or ML environments where bots are continuously trained. For example, training and developing bots to accurately answer questions and respond to tasks is both time and computationally intensive. Rather than training individual bots (e.g., the first bot 104 and/or the second bot 106) to be able to handle a multitude of tasks, the second channel 114 allows bots to connect with other bots that already know how to answer or respond to certain tasks. For example, returning to the example in FIG. 1, the first bot 104 may extend services offered by the first service 108 by collaborating with a second service 116 associated with the second bot 106 to forward questions relating to traffic and/or travel.

In order for the first bot 104 and the second bot 106 to collaborate and interact with one another, the first bot 104, the second bot 106, and the remote computing resource(s) 122 may be configured accordingly. The bot creators of the first bot 104 and/or the second bot 106, respectively, may permit the first bot 104 and the second bot 106 to communicate outside of their channels (e.g., outside of an application of the first service 108 and an application of the second service 116). For example, bots are conventionally deployed into specific channels, platforms, or applications and are not designed or configured to communicate with bots on other channels, platforms, or applications. Additionally, in some instances, bots are not configured to initiate conversation, but may only respond or communicate after human interaction. The first bot 104, however, using the remote computing resource(s) 122, may initiate conversation and communicate with the second bot 106, which may represent a bot outside of the first service 108 associated with the first bot 104.

In some instances, the first bot 104 and the second bot 106 may communicate via a bot-to-bot communication protocol established by the remote computing resource(s) 122. The bot-to-bot communication protocol may be natural language (i.e., the first bot 104 and the second bot 106 may communicate using natural language). As such, the first bot 104 and the second bot 106 may be developed by a bot creator with some degrees of NLP ability. For example, the first bot 104 may receive the question from the user 102, and using NLU and/or NLP techniques, may understand an intent and meaning of the question. Additionally, the communication between the first bot 104, the second bot 106, and the remote computing resource(s) 122 may be in natural language, and the second bot 106 may use NLU and/or NLP to understand messages from the first bot 104. Here, the first bot 104 and the second bot 106 communicate in natural language and the first bot 104 may ask the second bot 106 to perform actions, determine responses, and so forth for responding to the user 102.

In some instances, the first bot 104 and/or the second bot 106 may specify what intents they are respectively configured to perform, handle, and/or what customer utterances they are capable of recognizing. This may assist the first bot 104, the second bot 106, and/or other bot(s) finding one another for purposes of collaboration. Additionally, in some instances, the first bot 104 and/or the second bot 106 may annotate natural language queries to help the first bot 104, the second bot 106, and/or other bot(s) understand intent, such as in cases where bots may not be able to understand utterances of the user 102.

The first bot 104, the second bot 106, and the remote computing resource(s) 122 may have respective APIs that allow the first bot 104 and the second bot 106 to communicate with one another, infer intent, and determine meaning behind communications. For example, the first bot 104 may have an API 118, the second bot 106 may have an API 120, and the remote computing resource(s) 122 may have an API 152. Using natural language as the bot-to-bot communication protocol increases a flexibility of the first bot 104 and the second bot 106. To collaborate with one another through APIs, bot creators have to understand the API belonging to each of the bots that partake in a collaboration. Additionally, code must be written to make the appropriate calls to the API. The very robustness and individuality of the APIs make them an inflexible mechanism for integration with other bot(s). Understanding the API of each bot(s) introduces inflexibility, scaling issues, and is time and resource intensive. Instead, the systems and methods disclosed herein use natural language to perform the same function as specialized APIs, but provide more flexibility and scalability. The API 118 of the first bot 104 and the API 152 of the remote computing resource(s) 122 are configured such that communications between the first bot 104 and the remote computing resource(s) 122 occur in natural language. Additionally, the API 152 of the remote computing resource(s) 122 and the API 120 of the second bot 106 are configured such that communications between the remote computing resource(s) 122 and the second bot 106 occur in natural language. Bot developers of the first bot 104 and the second bot 106, respectively, may configure the API 118 of the first bot 104 and the API 120 of the second bot 106 such that they are able to communicate with the remote computing resource(s) 122. Additionally, this allows the first bot 104 and the second bot 106 to communicate via natural language, or to be able to infer natural language for performing or responding to tasks.

In some instances, while the messages being sent from one bot to another occur in natural language, communications may also occur through machine language. For example, inviting the second bot 106 to the second channel 114 (or otherwise creating the bot-to-bot channel) may not occur or be in natural language component. Additionally, messages exchanged between the first bot 104 and/or the second bot 106 may include non-human readable content (e.g. customer tokens, encrypted info, annotated text, etc.). As such, not all communications between the first bot 104 and the second bot 106 may occur, or be exclusively be conducted, in natural language. However, those communications pertaining to carrying out task(s) on behalf of the user 102, or requests made between the first bot 104 and the second bot 106 for carrying out user commands, may be in natural language for auditing and debugging purposes.

To permit the establishment of the second channel 114, and to allow the first bot 104 to communicate with the second bot 106, the first bot 104 may have access or be communicatively coupled to the remote computing resource(s) 122. Similarly, the second bot 106 may communicatively couple with the remote computing resource(s) 122. The remote computing resource(s) 122 may include processor(s) 124 and computer-readable media 126 that stores or otherwise has access to a registry 128. The registry 128 may represent a list, database, or directory of bot(s). The bot(s) may be voice agents, crawlers, transactional bots, chatbots, informational bots, and/or other kinds of bot(s). The registry 128 may store identifiers of the bot(s), a type of the bot(s), task(s) performable by the bot(s), a category of specialization of the bot(s), and so forth. The registry 128 may be searched and/or browsed to find other bot(s) to collaborate with for inviting the bot(s) into one or more channel(s) (e.g., the second channel 114). Additionally, or alternatively, the registry 128 may be searched and/or browsed by bot creators when developing the first bot 104 in order to program certain bot(s) the first bot 104 is to collaborate with. However, the first bot 104 may be programmed to search the registry 128 in order to locate other bot(s) to collaborate with. In some instances, the registry 128 may include functionality to recommend other bots for the first bot 104 and/or the second bot 106 to invite and collaborate with, based on a conversation history or direct request.

Bot creators may register their bot(s) with the registry 128. As shown, the registry 128 may store indications of the first bot 104, the second bot 106, and any number of $n^{th}$ bots 130. Without being registered, the bot(s) may be unable to locate the bot(s) in the registry 128 for purposes of collaboration. In other words, those bot(s) within the registry 128 may be capable of communicating via the bot-to-bot communication protocol and may have appropriate APIs (i.e., webhooks) to permit the natural language communication. Additionally, being registered with the registry 128 may allow the remote computing resource(s) 122 to establish the bot-to-bot channel between the bot(s). The registry 128 may also serve as a recognized, verified, and trusted database for which bot(s) are allowed to collaborate. In some instances, the remote computing resource(s) 122 may also control access to the API that allow the bots to communicate.

The registry 128 allows bot creators to increase the visibility of their bot(s) to aid the collaboration amongst bot(s). For example, bot creators often have a hard time finding bot(s) to collaborate with because some channels, services, or applications publish a list of bots available while others do not publish available bot(s). To effectively collaborate, bot(s) must be able to find other complimentary bot(s). The registry 128 therefore provides a directory of bot(s) in which other bot(s) are capable of collaborating with. The registry 128 may be updated as bot creators develop and/or update bot(s). The creation of bot(s) may lead to more collaboration and a greater selection of bot(s).

To safeguard against user data and comply with privacy laws (e.g., general data protection regulation (GDPR)) users 102 may exercise data subject rights (DSR) by making a best effort to pass on DSR requests to all bot(s) involved in a collaboration. For example, bot(s) that join a channel may be checked to ensure that their privacy policies are in compliance (e.g., time-based token). In some instances, the messages transmitted between the first bot 104 and the second bot 106 may be encrypted to further ensure data privacy. Additionally, private data may not be transmitted between the first bot 104 and the second bot 106 over the second channel 114. For example, as the first bot 104 is user facing and interacting with the user 102, the first bot 104 may not need to transmit personal data of the user 102 to the remote computing resource(s) 122 and/or the second bot 106 for purposes of assisting the user 102. That is, when the first bot 104 asks the second bot 106 "What is the travel time from Tacoma to Seattle?" this may not require personal data of the user 102 to be transmitted to the second bot 106. Instead, the second bot 106 may answer the question as posed by the user 102 and as received from the first bot 104. In response to receiving a response from the second bot 106, the first bot 104 may output a response to the user 102.

The first service 108 and the second service 116 are shown including components that permit the operation of the first bot 104 and the second bot 106, respectively. For example, the first service 108 may have processor(s) 132 and computer-readable media 134, and the second service 116 may also have processor(s) 136 and computer-readable media 138. As shown, the computer-readable media 134 and the computer-readable media 138 may store or otherwise have access to various information and/or components. The first bot 104 may be stored in the computer-readable media 134 and the second bot may be stored within the computer-readable media 138.

To understand the intent and meaning of questions of the user 102, as well as communications within the bot-to-bot channel (e.g., the second channel 114), the first bot 104 may have access to an NLU component 140 and the second bot 106 may include an NLU component 142. The remote computing resource(s) 122 may similarly have a NLU component. The NLU component 140 and the NLU component 142 may process the text received within messages to identify intents and entities contained in the transcribed messages. In some instances, NLU component 140 and the NLU component 142 may output data including a ranked list of NLU hypotheses or the top-scoring NLU hypothesis when multiple NLU hypotheses are generated for a single natural language input. In some instances, a top-scoring NLU hypothesis (and/or other NLU hypotheses), which includes NLU output data such as the intent data and/or entity data corresponding to the most likely interpretation of the user input, may be chosen. The first bot 104 may also be stored in association with the API 118 for making calls to the API 118 for communicating with the user 102 and/or with the remote computing resource(s) 122. Similarly, the second bot 106 may also be stored in association with the API 120 for making calls to the API 120 for communicating with the remote computing resource(s) 122.

The first bot 104 may be programmed, instructed, or otherwise configured to perform first task(s) 144. These first task(s) 144 may be preprogrammed by a bot creator of the first service 108, for example. In some instances, the first task(s) 144 may correspond to task(s), response(s), query(ies), or instructions the first bot 104 is to perform when assisting the user 102. The first task(s) 144 may include a succession of steps or operations that the first bot 104 is to perform when carrying out intents or performing tasks for the user 102. For example, in the scenario in FIG. 1, the first bot 104 may recognize the intent of the user 102 to know the travel time from one location to another. Here, the first bot 104 may be programmed to locate or identify a bot (i.e., the second bot 106) capable of responding to this command. In some instances, the first bot 104 may communicate with the remote computing resource(s) 122 for identifying the second bot 106. Therein, the remote computing resource(s) 122 may initiate a bot-to-bot channel between the first bot 104 and the second bot 106, and upon the bot-to-bot channel being established, an instruction may be sent to the second bot 106 to determine the travel time. In some instances, the first bot 104 may communicate with the remote computing resource(s) 122 to find a suitable bot (e.g., the second bot 106) to collaborate with. In such instances, a communication channel may exist between the first bot 104 and the remote computing resource(s) 122. Additionally, the first task(s) 144 may identify the capabilities of first bot 104. If the first bot 104 receives a task that is not included under the first task(s) 144, the first bot 104 may determine to engage another bot with different capabilities and performable task(s).

The second bot 106, meanwhile, may be programmed, instructed, or otherwise configured to perform second task(s) 146. These second task(s) 146 may be preprogrammed by a bot creator of the second service 116, for example. In some instances, the second task(s) 146 may correspond to task(s), response(s), query(ies), or instructions the second bot 106 is to perform when assisting the user 102 or responding to the first bot 104. In some instances, the second task(s) 146 may include a succession of steps or operations that the second bot 106 is to perform when carrying out intents of the user 102. Additionally, the second task(s) 146 may identify the capabilities of second bot 106 (e.g., determine road closures, determine travel time, determine routes, determine traffic, etc.).

Although FIG. 1 illustrates the establishment of the second channel 114, one or more additional channel(s) may be established between the first bot 104 and additional bot(s). In such instances, the remote computing resource(s) 122 may host, establish, or otherwise manage the creation and communication over the bot-to-bot channel(s). For example, depending on the user query, the remote computing resource(s) 122 may establish multiple channel(s) among the bot(s) for performing multiple tasks. The first bot 104 may be configured to determine how many bot(s) are to be conferred with and/or how many channel(s) are to be established. For example, one or more additional bot(s) may be invited into the second channel 114, whereby the bot(s) may be utilized for a first task (e.g., travel time) and one or more additional bot(s) may be utilized for a second task (e.g., reserving a ride share). Alternatively, the second channel 114 may be established for communication between the first bot 104 and the second bot 106, while another channel (e.g., a third channel) may be established for communication between the first bot 104 and the one or more additional bot(s). In these instances, the remote computing resource(s) 122 may establish the additional channel(s). Moreover, in some instances, the second bot 106 may have previously established bot-to-bot channels with other bot(s) and/or bot creator(s). In this sense, the second bot 106 may communicate with other bot(s) and/or bot creator(s) over a plurality of channel(s), and not just the first bot 104. In this environment, each bot(s) may have respective channels between users 102, as well as other bot(s) and/or bot creator(s).

In some instances, although FIG. 1 illustrates the user 102 interacting with a chatbot, the user 102 may interact with voice bots or agents (e.g., Amazon® Alexa, Apple® Siri, Microsoft® Cortana, etc.). For example, the first bot 104 may represent a voice bot and the second bot 106 may represent a chatbot. In these instances, the user 102 may pose similar queries by speaking into devices equipped with microphones. The applications running on these devices may use NLP to understand user speech and intent for the purposes of responding to the user 102. In such instances, the voice bots may communicate with one or more additional bot(s) over one or more channel(s) (e.g., the second channel 114) for responding to the user 102. Additionally, or alternatively, voice bots and chatbots may communicate with one another over one or more channel(s).

In some instances, the first service 108 and/or the second service 116 may also be a service offered by the remote computing resource(s) 122. In other words, although FIG. 1 illustrates the first service 108, the second service 116, and the remote computing resource(s) 122 being separate, the first service 108, the second service 116, and the remote computing resource(s) 122 may be offered by a single entity. Additionally, or alternatively, the first service 108 and/or the second service 116 may be applications, web pages, or programs offered or hosted by the remote computing resource(s) 122. Regardless of the specific implementation, the first service 108 and the second service 116 (or the bot(s) and/or applications thereof), may have access to the registry 128 for purposes of locating other bot(s) for collaboration.

Additionally, in some instances, the registry 128 or the remote computing resource(s) 122 may store active bot-to-bot channels to allow other bot(s) to join collaborative sessions. By way of example, channel(s) may include "weather," "traffic," "book recommendations," and so forth. These channel(s) may be open, active, and joinable by other bot(s). Within these channel(s) the bot(s) may respectively pool their resource(s), programming, and expertise to develop solution(s), and/or provide assistance. For example, if a bot has a question, task, or query related to "book recommendations," the bot may join the "book recommendation" channel and pose a question to the channel. The bot(s) within this channel may receive the query and provide assistance for book recommendations.

The history of the second channel 114 may be stored by the first service 108, the second service 116, and/or the remote computing resource(s) 122. For example, as shown in FIG. 1, the remote computing resource(s) 122 may maintain a log 148. In some instances, the bot(s) and/or bot creator(s) may not view the log 148 of the second channel 114 prior to joining the second channel 114. The log 148 may maintain a history of the second channel 114 (and other channels), including what questions were asked between the first bot 104 and the second bot 106, what questions were not answered, and so forth. This may allow bot creator(s) to audit the messages and determine how to improve bot-to-bot communication and interactions with the user 102 (e.g., via further training and/or programming). Additionally, as the first bot 104 and the second bot 106 communicate with one another via the second channel 114 hosted by the remote computing resource(s) 122, the communication may be stored in the log 148.

The messages may be stored in the log 148 in association with message receiver ID, message channel ID and the timestamp when message is sent. A bot and/or bot creator may not receive, view, or request message(s) in the log 148 if the bot and/or bot creator is not in the second channel 114. In this sense, cross-channel communication (e.g., log viewing) may not be permitted. In instances where a bot and/or bot creators requests the log 148 of the second channel 114, messages may be retrieved using an identification of the second channel 114 and an identification of the receiver. As such, bots and/or bot creators may be restricted from receiving a history of the second channel 114 prior to joining. Additionally, once a bot and/or bot creator has left a channel that it previously joined, the bot and/or bot creator may no longer receive messages transmitted within that channel until the bot and/or bot creator rejoins the channel.

The remote computing resource(s) 122 further stores the bot-to-bot communication protocol 150 that is accessible by bot(s) and bot creator(s). The bot-to-bot communication protocol 150 may indicate the webhooks (e.g., APIs) and set standards with which the bot(s) are to communicate over a bot-to-bot channel. For example, the bot-to-bot communication protocol may indicate features, functions, or calls of the APIs (e.g., the API 118 and the API 120) that permit the first bot 104 and the second bot 106 to communicate using natural language. The format of the message transmitted between the first bot 104 and the second bot 106 allows for the understanding and deciphering of the messages. For example, the first bot 104 may include text in a message in a way that the second bot 106 is able to understand. In some instances, the first bot 104 may communicate with the second bot 106 by accessing the second task(s) 146 the second bot 106 is able to perform. This allows the first bot 104 to phrase questions in such a way that the second bot 106 is able to understand.

In some instances, the first service 108 and the second service 116, or other services with bot(s) wishing to collaborate with other bot(s), may obtain permission from the remote computing resource(s) 122 to utilize the API 118 and the API 120, respectively. For example, the first service 108 and the second service 116 may agree to terms established by the remote computing resource(s) 122 for using the APIs and the bot-to-bot communication protocol 150. In this sense, the remote computing resource(s) 122 may verify and authenticate those services wishing to use the API and the bot-to-bot communication protocol 150. For example, authentication may be performed via a token issued by the API 152 of the remote computing resource(s) 122. The token may need to be renewed periodically to ensure that bots have been registered, verified, and/or are authorized to use the remote computing resource(s) 122 for establishing of the bot-to-bot channel.

In some instances, the user 102 may provide the bot(s), service(s), and/or application(s) with permission to access other applications on the device of the user 102. This may provide additional assistance to the user 102. For example, the first bot 104 may have permission to read phone notifications for purposes of setting calendar events, setting reminders, and so forth.

As used herein, a processor, such as the processor(s) 124, 132, and/or 136 may include multiple processors and/or a processor having multiple cores. Further, the processor(s) 124, 132, and/or 136 may comprise one or more cores of different types. For example, the processor(s) 124, 132, and/or 136 may include application processor units, graphic processing units, and so forth. In one implementation, the processor(s) 124, 132, and/or 136 may comprise a microcontroller and/or a microprocessor. The processor(s) 124, 132, and/or 136 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

As used herein, the computer-readable media 126, 134, and/or 138 may be implemented as computer-readable storage media ("CRSM"), which may be any available physical media accessible by the processor(s) 126, 134, and/or 138 to execute instructions stored on memory. The memory (or non-transitory computer-readable media) may include volatile and nonvolatile memory, removable and non-removable media implemented in any method or technology for storage of information, such as computer-readable instructions, data structures, program modules, or other data. Such memory includes, but is not limited to, random access memory ("RAM"), read-only memory ("ROM"), erasable programmable read-only memory ("EEPROM"), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device and the processor(s) 124, 132, and/or 136.

Figure 2:
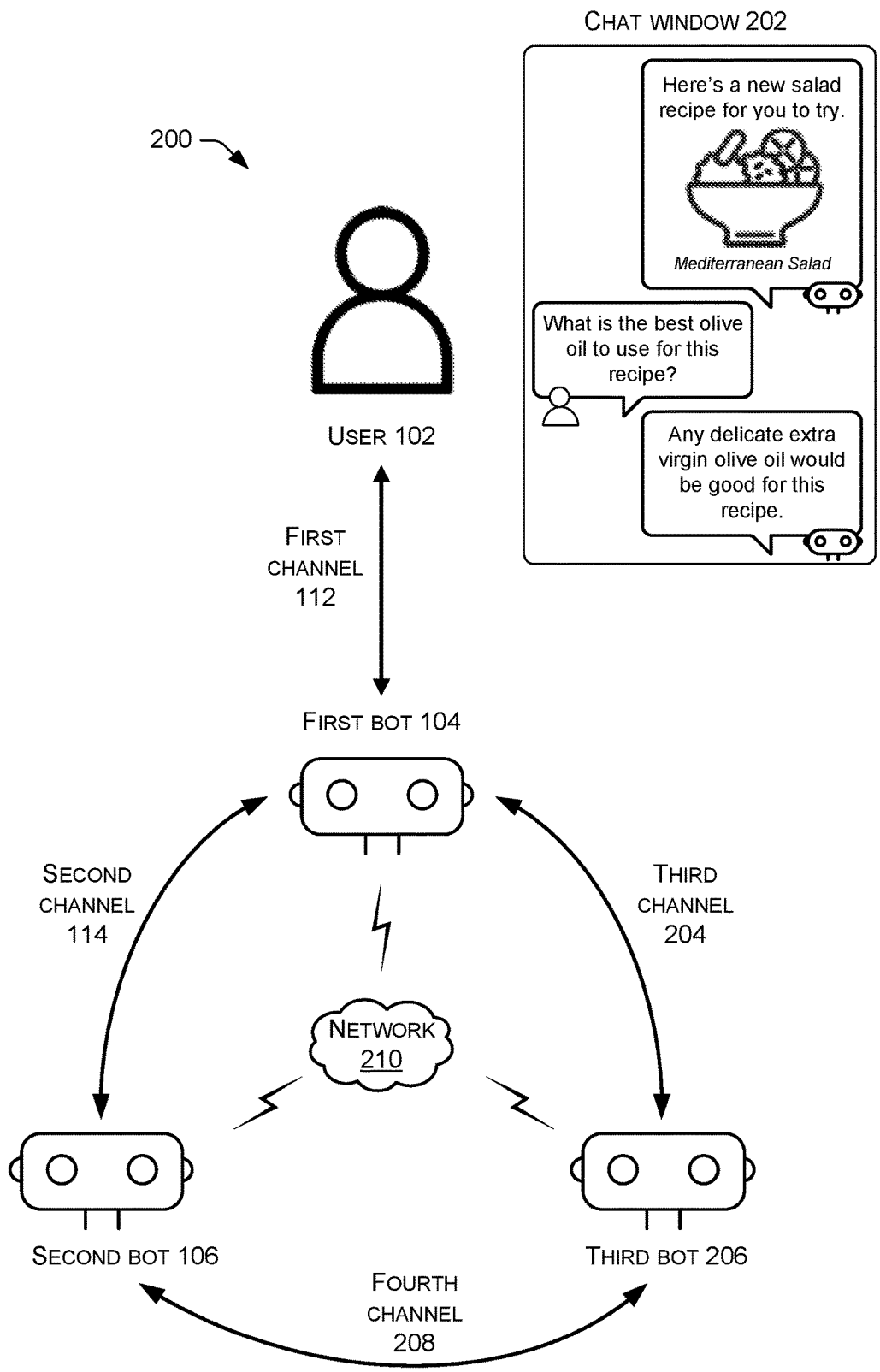
FIG. 2 illustrates an example environment in which bots may collaborate with one another, over multiple bot-to-bot channels, according to an embodiment of the present disclosure.

FIG. 2 illustrates an environment 200 in which multiple bots may communicate and collaborate to better answer user questions. For example, the environment 200 illustrates that the user 102 may communicate with the first bot 104 regarding a recipe. In some instances, the first bot 104 may be a chatbot operating on an application of a device of the user 102. The first bot 104 may engage in conversation with the user 102, as shown in the chat window 202, for presenting a new recipe for the user 102 to try. The user 102 and the first bot 104 may be in communication via the first channel 112. In the example of FIG. 2, the first bot 104 may correspond to a bot that helps the user 102 learn about new recipes. Hence, the first bot 104 may present a new salad recipe for the user 102 to try.

The user 102 may respond with questions about ingredients in the recipe, for example, "What is the best olive oil for this recipe?" In some instances, the first bot 104 may be unable to answer the question given the expertise of the first bot 104. That is, the first bot 104 may not know the best olive oil for the recipe or may be unable to determine the best olive oil. However, in instances were the first bot 104 is unable to answer the question, rather than returning an unhelpful error message such as "I do not understand your question" or "I do not know," the first bot 104 may collaborate with one or more additional bot(s).

For example, the first bot 104 may transmit a request to the remote computing resource(s) 122 for establishing the second channel 114. In some instances, the second channel 114 may represent a chatroom in which the first bot 104 and the second bot 106 may communicate and exchange messages using natural language. The second bot 106, in the example of FIG. 2, may be a bot programmed to answer questions about olive oil. Here, after establishing the second channel 114 the first bot 104 may forward the question from the user 102 to the remote computing resource(s) 122. The remote computing resource(s) 122 may then forward the question to the second bot 106 and, via the remote computing resource(s) 122, return a response to the first bot 104. Upon receipt, the first bot 104 may output the response the user 102 in the chat window 202.

Additionally, or alternatively, the first bot 104 may transmit a request to the remote computing resource(s) 122 for establishing a third channel 204 with a third bot 206. In some instances, the third channel 204 may represent a chatroom in which the first bot 104 and the third bot 206 are able to communicate and exchange messages using natural language.

In some instances, the remote computing resource(s) 122 may send, on behalf of the first bot 104, invitations to the second bot 106 and the third bot 206 for joining the second channel 114 and the third channel 204, respectively. That is, the second bot 106 and the third bot 206 may be invited to join channels at the request of the first bot 104, or a creator of the channel. The second bot 106 and the third bot 206 may choose to communicate with the first bot 104, respectively. The second bot 106 and/or the third bot 206 may choose to accept or deny the invite. If accepted, the second bot 106 and the third bot 206 may communicate with the first bot 104 over the remote computing resource(s) 122 or the channel(s) established by the remote computing resource(s) 122. In some instances, the collaboration between the first bot 104 with the second bot 106 and/or the third bot 206 may serve to verify or authenticate the user 102. For example, the first bot 106 may authenticate the user 102 with the second bot 106 and/or the third bot 206 to purchase goods, services, and so forth. Alternatively, if the invitation is denied, the first bot 104 may look for other bot(s) within the registry 128 capable of answering the questions.

In some instances, the second bot 106 and the third bot 206 may be in communication over a fourth channel 208. In some instances, the fourth channel 208 may represent a chatroom whereby the second bot 106 and the third bot 206 are able to communicate and exchange messages via the remote computing resource(s) 122. The second bot 106 and/or the third bot 206 may initiate the fourth channel 208 by transmitting a request to the remote computing resource(s) 122.

In some instances, the remote computing resource(s) 122 may establish the second channel 114 and/or the third channel 204 on an as needed basis, in response to questions of the user 102, and/or may maintain the second channel 114 and/or the third channel 204. Moreover, the remote computing resource(s) 122 may establish the second channel 114 and/or the third channel 204 at the request of the first bot 104. In some instances, rather than initiating the second channel 114 and/or the third channel 204 each time the user 102 poses a question the first bot 104 is not suited or equipped to answer, the second channel 114 and/or the third channel 204 may be pre-existing (e.g., already established). The first bot 104 may know which bot(s) to utilize for specific questions posed by the user 102 and may utilize existing channel(s) of the remote computing resource(s) 122. Here, the first bot 104 may be a member or participant of the existing channels in order to make use of or utilize the pre-existing channels. In some instances, the second bot 106 and/or the third bot 206 may be recommended bots to the first bot 104, in which the first bot 104 may want to collaborate with for resolving questions of the user 102 and/or otherwise assisting the user 102. In such instances, however, collaboration may take place if the first bot 104 invites the second bot 106 and/or the third bot 206 into the channel, or the first bot 104 is already a member of channel established by the second bot 106 or the third bot 206.

As shown in FIG. 2, the first bot 104, the second bot 106, and the third bot 206 may be in communication over a network 210. The network 210 may represent any type of communication network, including a data network, and may be implemented using wired infrastructure (e.g., cable, CATS, fiber optic cable, etc.), a wireless infrastructure (e.g., RF, cellular, microwave, satellite, Bluetooth, etc.), and/or other connection protocols.

By establishing collaborations with the second bot 106 and/or the third bot 206, the user 102 may have a positive experience with the application and/or the first bot 104. That is, instead of arriving at a conversation dead-end, forwarding the user 102 to another portal to sign on to a different platform that includes a bot capable of handling the question, retyping the question, switching between platforms with different bots, the bot-to-bot communication protocol 150 allows the first bot 104 to communicate with other bot(s) to handle questions of the user 102. Moreover, in this scenario, the user 102 interacts with a single bot, the first bot 104, and personal information may not be sent to the second bot 106 and/or third bot 206 to answer the question. This also decreases the amount of data sent between bot(s). As a result, the first bot 104 may crowdsource intelligence to better answer questions of the user 102.

However, in some instances, personal data may be sent if the data is encrypted and all bots participating in the collaboration are authorized. For example, over the channels, customer preferences maybe exchanged (e.g. pizza toppings associated with a particular customer to order a pizza).

Figure 3:
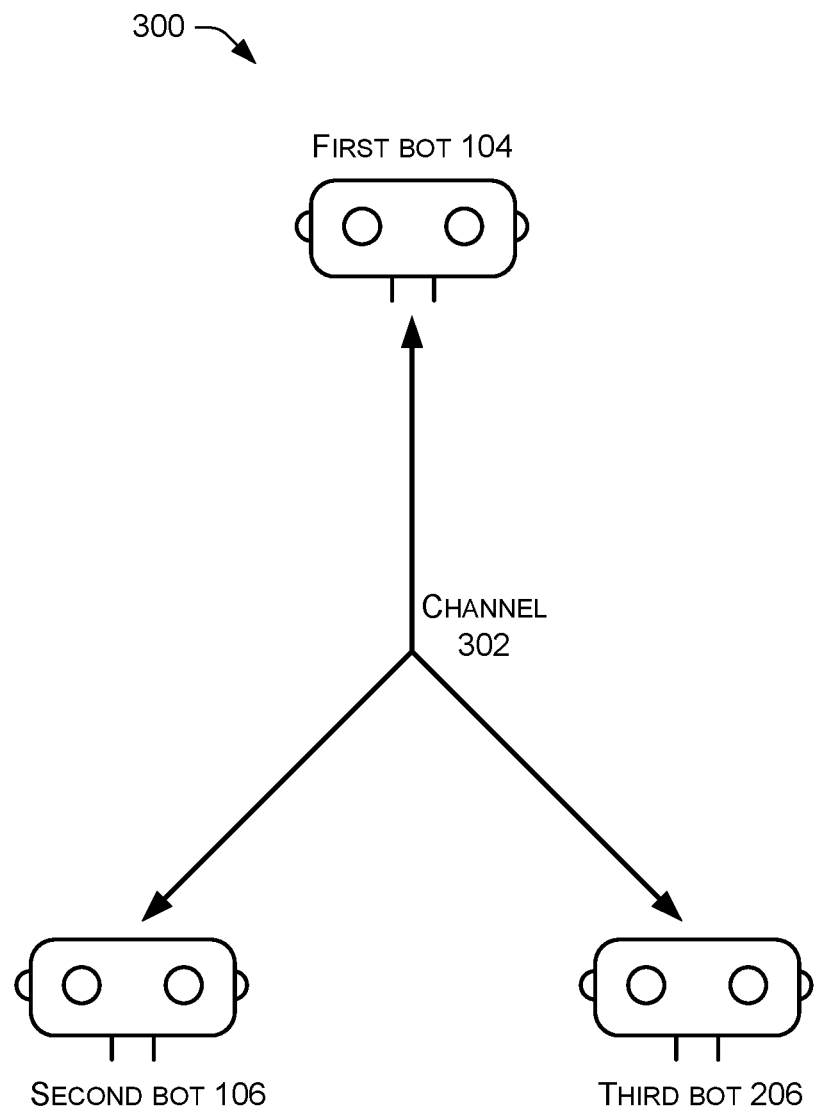
FIG. 3 illustrates an example environment in which bots may collaborate with one another over a single bot-to-bot channel, according to an embodiment of the present disclosure.

FIG. 3 illustrates an example environment 300 in which the first chatbot 104 engages with multiple bot(s) over a single channel. For example, rather than the remote computing resource(s) 122 establishing channels for the first bot 104 to communicate with individual bot(s), the remote computing resource(s) 122 may establish a single channel in which the first bot 104 may collaborate with multiple bot(s).

As illustrated, the remote computing resource(s) 122 may initiate a channel 302 for the first bot 104 that represents a chatroom in which the first bot 104, the second bot 106, and/or the third bot 206 may communicate. Within the channel 302, the first bot 104, the second bot 106, and/or the third bot 206 may exchange messages. In some instances, the first bot 104 (or the bot that initiates the channel 302) may post message or pose questions generally within the channel 302 and/or may direct specific questions to specific bot(s) within the channel 302.

Figure 4:
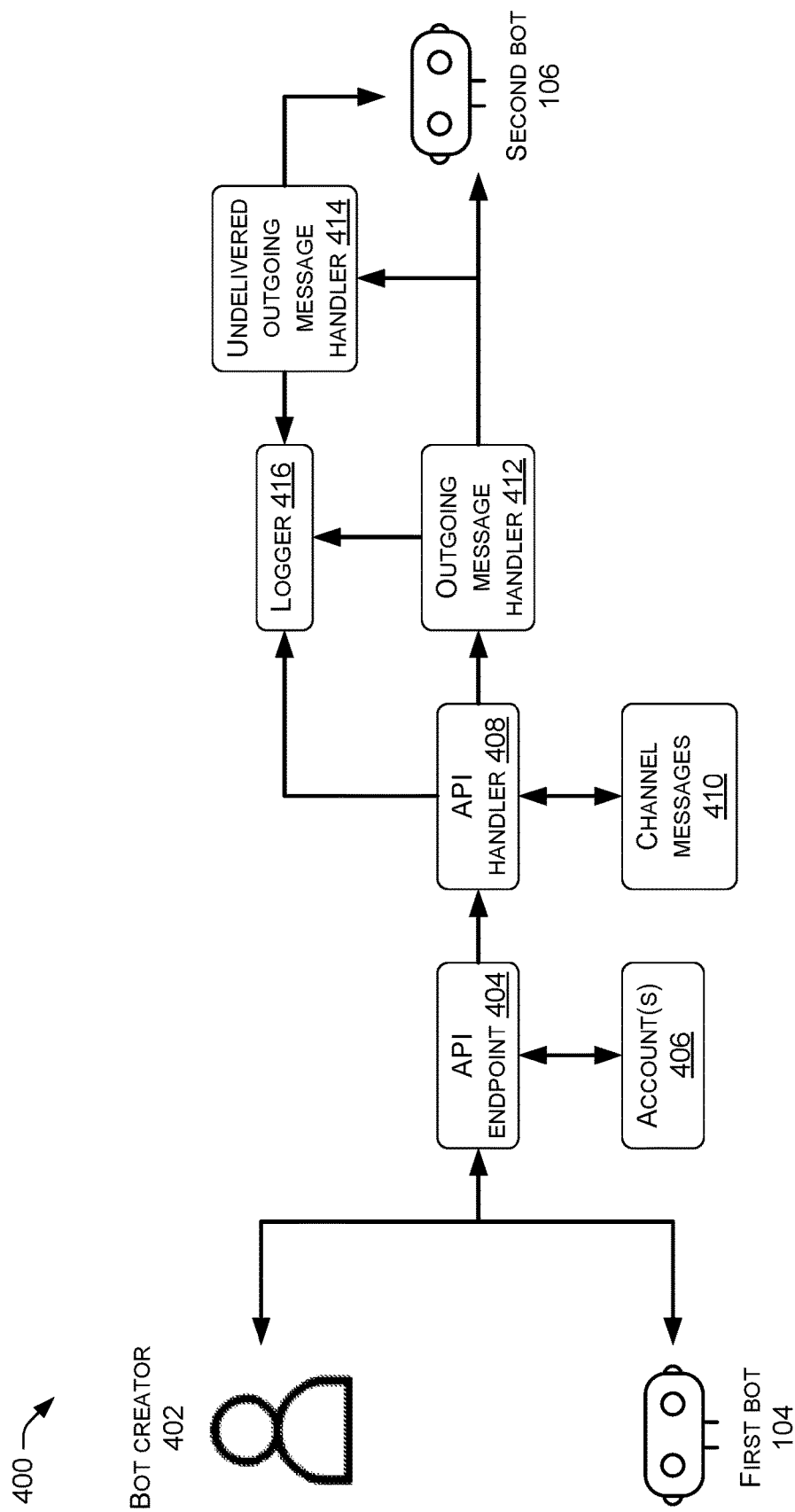
FIG. 4 illustrates an example architectural and flow diagram for communicating and establishing a bot-to-bot channel, according to an embodiment of the present disclosure.

FIG. 4 illustrates an example architecture and dataflow diagram 400 for carrying out the operations associated with establishing a bot-to-bot channel and/or communication that takes place between bot(s), such as the first bot 104 and the second bot 106.

The first bot 104 and a bot creator 402 of the first bot 104 may use the API 118, for example, to communicate with the second bot 106 and the remote computing resource(s) 122. The API 118 may include an API endpoint 404 that exposes the first bot 104 and/or the bot creator 402 to perform call functions. The API endpoint 404 validates inputs (e.g., queries) received from the first bot 104 and/or the bot creator 402. Additionally, the API endpoint 404 may validate requests received from other bot(s) (e.g., the second bot 106) and/or the remote computing resource(s) 122.

In some instances, the first bot 104 and/or the bot creator 402 may use usernames and passwords to generate an ID token. Once first bot 104 and/or the bot creator 402 has an ID token, the first bot 104 and/or the bot creator 402 may be authenticated. As discussed herein, the first bot 104 and/or the bot creator 402 is able to request bot-to-bot channels. Once the first bot 104 and/or the bot creator 402 requests a channel, for example, and the remote computing resource(s) 122 establishes the channel, the first bot 104 and/or the bot creator 402 may become administrators of the channel. Once the first bot 104 and/or the bot creator 402 becomes the administrator, the first bot 104 and/or the bot creator 402 may request invitations be sent to other bots and/or bot creators asking them to join the channel. Other bots and/or bot creators may not be able to join the channel without an invitation.

The API endpoint 404 may have an usage plan or predetermined use requirements that limit or restrict throttling and quota for the bot creator 402. For example, when the bot creator 402 registers an account, a key may be returned to the bot creator 402 that indicates the usage plan and/or restrictions in usage. The API endpoint 404 may check or determine that the usage plan of the bot creator 402 is satisfied.

In some instances, the API endpoint 404 may be a representational state transfer (REST) API endpoint that uses uniform resource locators (URLs) to receive or send information with the second bot 106. In such instances, when the API endpoint 404 includes a REST API endpoint, the API endpoint 404 may use four different hypertext transfer protocol (HTTP) 1.1 verbs (GET, POST, PUT, and DELETE) to perform tasks and communicate with the second bot 106.

Account(s) 406 may handle user account operations such as registration, generating tokens, password reset, and so forth. The account(s) 406 may be integrated with API endpoint 404 for authentication. Users will use username and password to generate tokens for other bot(s) to join bot-to-bot channels or to join the registry 128, and later to use the API 118 to communicate with other bot(s).

An API handler 408 may validate requests and transmit valid requests to other bot(s) and the remote computing resource(s) 122. The API hander 408 may serve as a queue for messages after the message are validated for delivering to the bot(s). Messages that arrive first will be delivered first so that the conversation between the first bot 104 and the second bot 106 is understandable. Therefore, the API hander 408 employs a "first in, first out" (FIFO) queue when transmitting messages. In some instances, the API handler 408 may avoid situations where channels have too many messages being transmitted.

The API handler 408 forwards messages into the channel between the first bot 104 and the second bot 106. The API handler 408 may also handle registration, generate token logic, invite other bot(s) to a channel, and/or remove bot(s) from the channel.

The channel messages 410 may store information about the bot-to-bot channel between the first bot 104 and the second bot 106. This information may include bot creator name, bot creator identification, bot name, bot identification, bot webhook and/or bot webhook request/response, as well as channel identification, user identification, and user member status.

The outgoing message handler 412 receives messages and sends the message to bot webhooks. In some instances, message delivery may be asynchronous. The outgoing message handler 412 may utilize identifications associated with the message to ensure that the messages are transmitted to the proper webhooks of the bot(s).

The undelivered outgoing message handler 414 is invoked when messages cannot be delivered to bot webhooks. The outgoing message handler may invoke this call asynchronously, passes undelivered messages, and may retry to re-deliver undelivered messages.

A logger 416 is further provided to log messages transmitted between the first bot 104 and the second bot 106 (e.g., the log 148).

Figure 5:
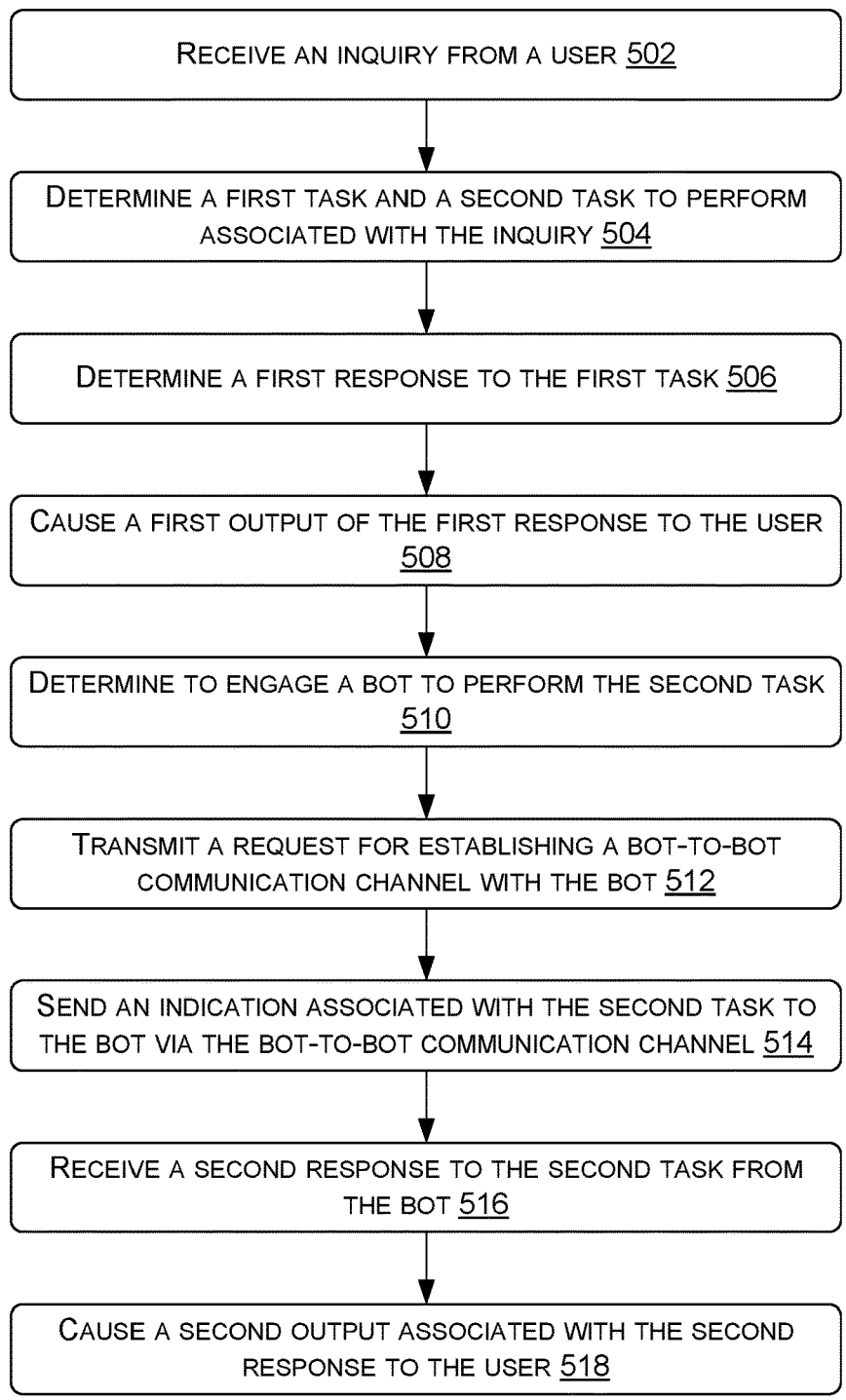
FIG. 5 illustrates an example process in which bots transmit requests to establish a bot-to-bot channel, according to an embodiment of the present disclosure.
Figure 6:
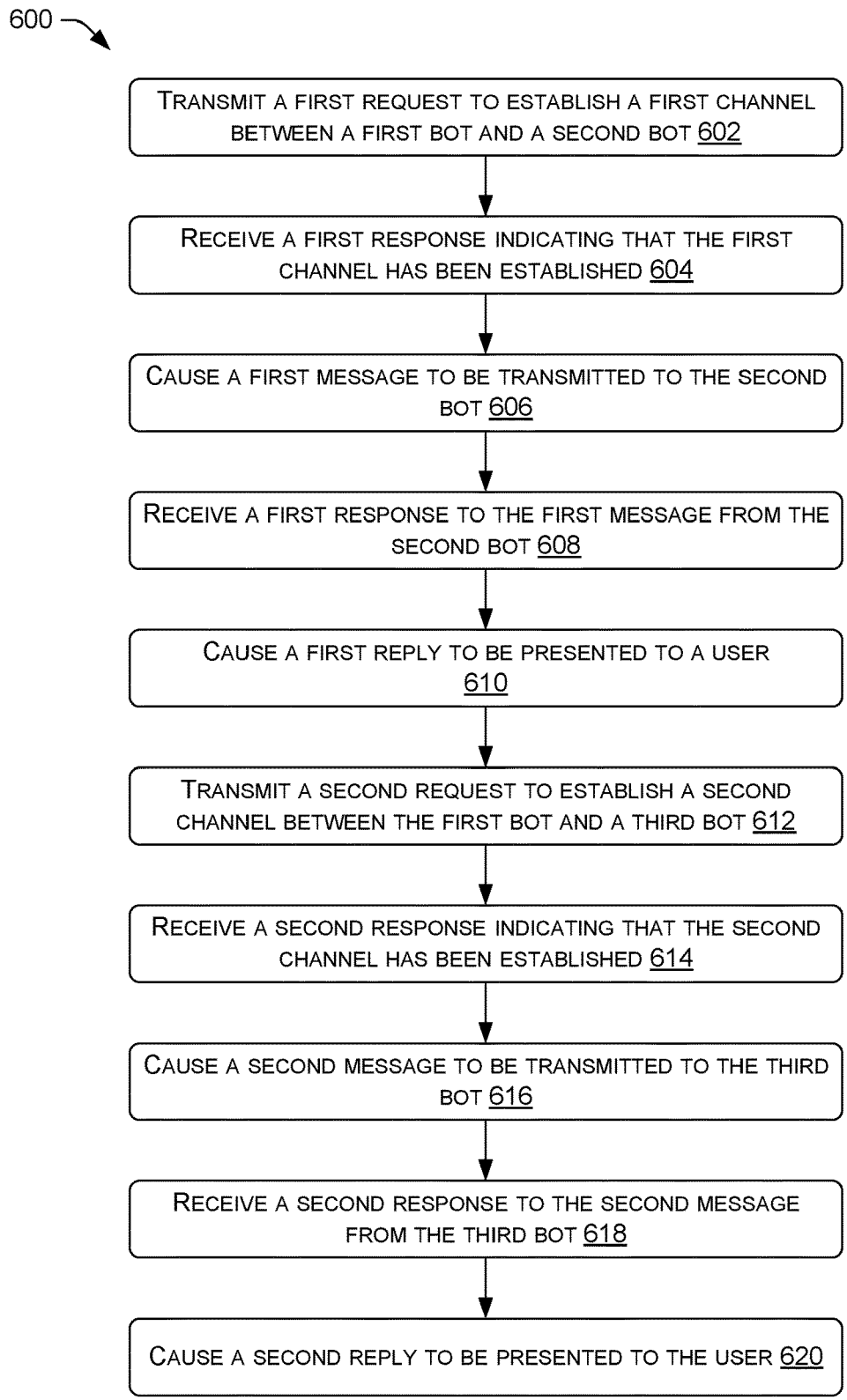
FIG. 6 illustrates an example process in which bots collaborate with one another, according to an embodiment of the present disclosure.
Figure 7:
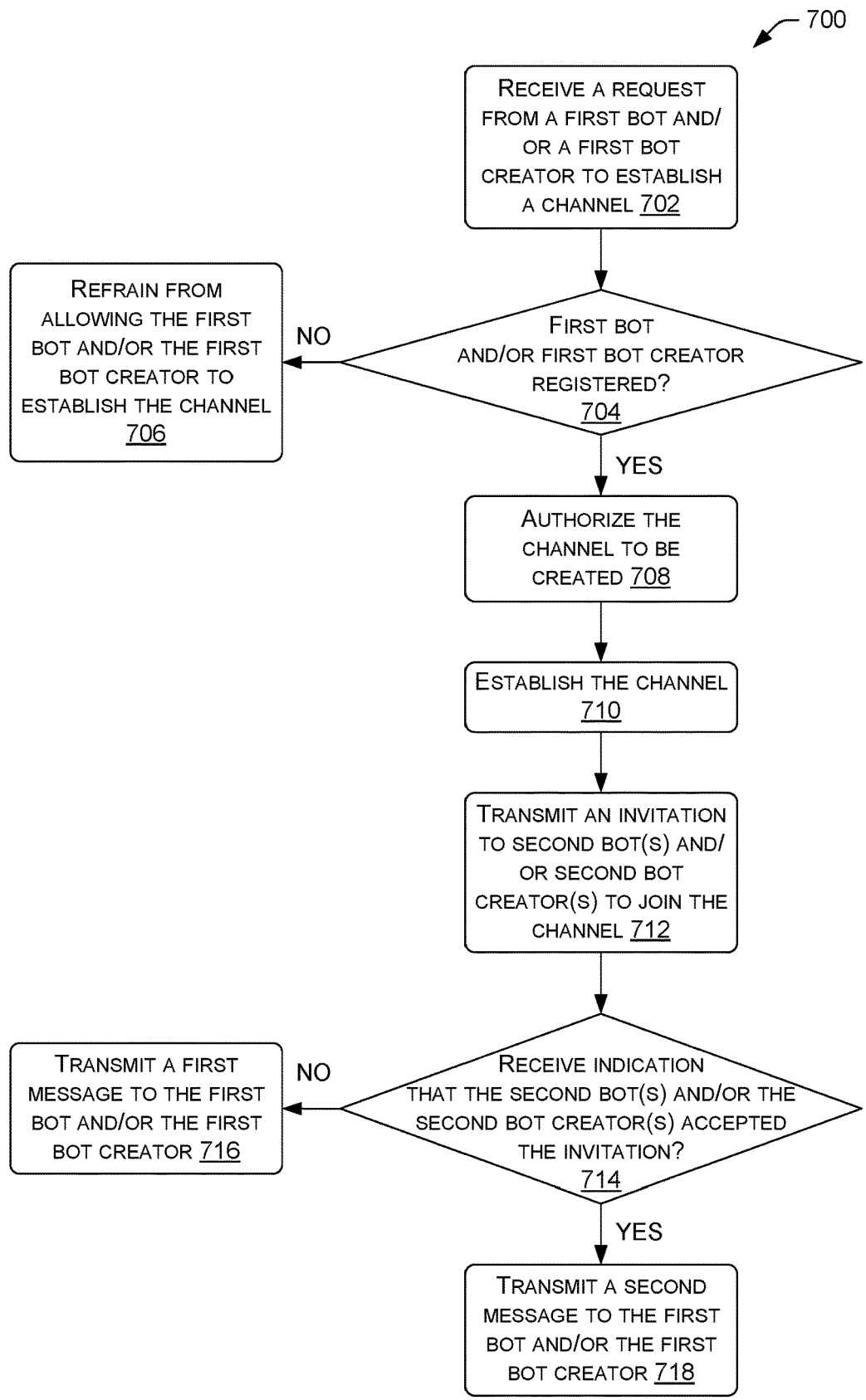
FIG. 7 illustrates an example process for establishing a bot-to-bot channel, according to an embodiment of the present disclosure.

FIGS. 5-7 illustrate various processes related to bots and/or bot creator(s) collaborating over bot-to-bot channels. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, and systems described in the examples herein, such as, for example those described with respect to FIGS. 1-4, although the processes may be implemented in a wide variety of other environments, architectures, and systems.

FIG. 5 illustrates an example process 500 in which bots communicate to fulfill user commands or provide assistance to users.

At 502, the process 500 may receive an inquiry from a user. For example, the first bot 104 may receive a request, task, or inquiry from the user 102. In some instances, the inquiry may be a specified command asking the first bot 104 to perform an explicit task or may be a general dialogue with the user 102. In some instances, the user 102 may engage the first bot 104 (e.g., open an application, initiate communication, etc.) or the first bot 104 may engage the user 102. For example, the first bot 104 may receive a notification from a location component of the device of the user 102 and initiate a conversation with the user 102. For the purpose of illustration, in the context of the process 500, the first bot 104 may receive an inquiry about restaurants located proximate to the user 102. However, it is to be understood that the first bot 104 may initiate the conversation with the user 102 by transmitting a notification that identifies restaurants located proximate to the user 102.

At 504, the process 500 may determine a first task and a second task to perform associated with the inquiry. For example, based at least in part on receiving the inquiry, the first bot 104 may determine one or more tasks, such as the first task 144 and the second task 146, for purposes of responding to the inquiry or assisting the user 102. The first task 144, for example, may be to locate restaurants within a certain proximity of the user 102 (e.g., using the location of the user 102). Additionally, the first bot 104 may implicitly or explicitly determine the second task 146.

This second task may be associated with the inquiry and/or the first task 144 for providing further assistance to the user 102. For example, in some instances, the second task 146 may be determining a weather forecast for the user 102, a travel route to the one of the restaurants, making a reservation at one of the restaurants, updating a calendar of the user 102, and so forth. For the purpose of illustration, in the context of the process 500, the second task 146 may be determining a travel route to one of the restaurants.

The first bot 104 identifies the second task 146 for providing further assistance to the user 102 to improve the experience of the user 102 interacting with the first bot 104, an application associated with the first bot 104, and/or the first service 108. While identifying restaurants proximate to the user 102 is helpful and fulfills the inquiry of the user 102, the first bot 104 may be programmed to identify other potential tasks associated with the inquiry, in hopes of providing further assistance. That is, providing a travel route to the user 102 may help the user 102 and improve user experiences.

In the context of the process 500, the first bot 104 may be a restaurant locator bot programmed to identify restaurant recommendations for the user 102. The user 102 in this sense may use an application associated with the first bot 104 for locating restaurants. Additionally, in the context of the process 500, the second bot 106 may be a navigational bot programmed to determine travel routes between two locations. The first bot 104 and the second bot 106 may respectively be programmed, linked to databases, have access to historical data and/or preferences of the user 102, etc. for purposes of carrying out their respective tasks. For example, the first bot 104 may know or be able to determine which types of food the user 102 prefers (e.g., from historical data), while the second bot 106 may be able to determine road closures (e.g., by accessing third-party databases).

Additionally, as mentioned above, the first bot 104 may be programmed to automatically identify potential tasks associated with the inquiry of the user 102. For example, in response to the user 102 asking for recommendations of restaurants, the first bot 104 may determine potential tasks that provide further assistance to the user 102, or which may be helpful to the user 102. However, these tasks may not be performable or carried out by the first bot 104, but instead, the first bot 104 may collaborate with one or more additional bot(s) (e.g., the second bot 106) for purposes of carrying out the tasks.

Returning to the process 500, at 506 the process 500 may determine a first response to the user. For example, the first bot 104 may use a location of the user 102, historical user preferences, etc. to identify one or more restaurants for the user 102. The first response may, for example, be an indication of the one or more restaurants and/or may include links to the one or more restaurants to allow the user 102 to view menus, wait times, etc.

At 508, the process 500 may cause a first output of the first response to the user. For example, the first bot 104 may display the first response to the user 102 within the chat window 110. In such instances, the first bot 104 may be a chatbot designed and programmed to engage in conversation with the user 102 that mimics human interaction. Additionally, or alternatively, the first bot 104 may output an indication associated with the second task 146 that is actionable by the user. For example, the first bot 104 may output "Would you like me to book a reservation for you?" or "Would you like a travel route?" Here, the user 102 may respond with "yes" or "no" (or not at all) which may prompt the first bot 104 to appropriately engage the second bot 106 (e.g., via the bot-to-bot communication).

At 510, the process 500 may determine to engage a bot to complete the second task. For example, the first bot 104 may understand that it is not configured or capable to perform the second task 146 and may seek the assistance of the second bot 106 to perform the second task 146. To identify the second bot 106, in some instances, the first bot 104 may communicate with the remote computing resource(s) 122 to search the registry 128 to identify bot(s) capable of determining travel route(s) and/or times, and/or the first bot 104 may have a history of bot(s) it has previously interacted with in assisting users 102. Such searching may be based on the second task(s) 146 performable by the second bot 106. Additionally, the first bot 104 may identify the second bot 106 as being compatible with the first bot 104 and capable of communicating using natural language.

At 512, the process 500 may transmit a request for establishing a bot-to-bot communication channel with the bot. For example, the first bot 104 may transmit a request to the remote computing resource(s) 122 for establishing the bot-to-bot communication channel in which the first bot 104 and the second bot 106 may communicate and exchange messages with one another. As discussed herein, this channel may include a bot-to-bot communication protocol in which the first bot 104 and the second bot 106 are programmed to communicate via natural language. Using the remote computing resource(s) 122, and the bot-to-bot communication channel established by the remote computing resource(s) 122, the first bot 104 and the second bot 106 may communicate using natural language. To permit this communication, the first bot 104, the second bot 106, and the remote computing resource(s) 122 include appropriate APIs that are configured to process natural language for performing tasks. Without appropriate API and/or the ability to communicate with natural language, the bot-to-bot channel may be restricted from being established. As part of transmitting the request, the remote computing resource(s) 122 may also identify the bot(s) (i.e., the second bot 106) in which the first bot 104 is attempting to collaborate with. For example, the remote computing resource(s) 122 may transmit an invite to the second bot 106 for joining the bot-to-bot communication channel.

At 514, the process 500 may send an indication associated with the second task to the bot via the bot-to-bot communication channel. For example, the first bot 104 may transmit a request to the remote computing resource(s) 122 and the remote computing resource(s) 122 may forward this request to the second bot 106. The request, in some instances, may indicate the second task to perform. This second task may be in natural language, such as "please find travel times and routes to the following restaurants," "what are the travel times and routes to the following restaurants," "determine the travel times and routes to the following restaurants," and so forth. This indication may be transmitted in natural language to allow moderators and/or bot creators 402 to audit or look-in on conversations between the bots. In other words, because the first bot 104 and the second bot 106 communicate using natural language, this allows the bot creators 402 to understand the messages communicated between the bots. The API 118 of the first bot 104 and the API 120 of the second bot 106 may respectively be programmed and coded to transmit and receive messages in natural language.

At 516, the process 500 may receive a second response to the second task from the bot. For example, the first bot 104 may receive travel times and routes to the restaurants from the remote computing resource(s) 122, via the second bot 106. The second response may include data that indicates the travel times and/or clickable links that surface maps or navigational components for guiding the user 102 along routes (e.g., using one or more additional applications). The second response may also represent, or correspond to, the second bot 106 asking follow-up questions to fulfill the second task such as, "Do you want to avoid tolls?, Are you walking, biking, using a car?, etc.?" In other words, performing the second request may require additional follow-ups in the form of yet more requests. In some instances, an indication on the status of the request (incomplete, need more info, etc.) may also be transmitted to indicate the status of fulfilling the second request.

At 518, the process 500 may cause a second output associated with the second response to the user. For example, after the first bot 104 receives the second response from the second bot 106, via the remote computing resource(s) 122, the first bot 106 may cause a response associated with the second response to be displayed in the chat window 110. In some instances, the first bot 104 may output the exact response received from the second bot 106 or the first bot 104 may modify the second respond before being output to the user 102.

In some instances, the first bot 104 may output the first response and the second response sequentially, close-in-time, and/or without receiving feedback or prompts of the user 102. For example, the first bot 104 may output single response that indicates the restaurants and the travel times and/or routes to each restaurant. In response, the user 102 may click on one of the restaurants and may automatically have a determined travel route. As another example, the first response may indicate the restaurants (e.g., "Here's a restaurant that you may like") and the second response may indicate the travel route (e.g., "I have already determined a travel route for you to the restaurant.").

Although the process 500 illustrates a scenario whereby the first bot 104 communicates with a single bot over the bot-to-bot communication channel established by the remote computing resource(s) 122 (e.g., the second bot 106), one or more additional bot(s) and/or bot creator(s) may be invited into the channel for collaborating and developing a solution or providing assistance to the first bot 104, the second bot 106, and/or the user 102. In doing so, the API 152 of the remote computing resource(s) 122 may communicate with the respective APIs of the bot(s) for transmitting and receiving messages and allow the bot(s) to collaborate.

FIG. 6 illustrates an example process 600 in which bot(s) may communicate over one or more channel(s).

At 602, the process 600 may transmit a first request to establish a first channel between a first bot and a second bot. For example, the first bot 104 may transmit a request to the remote computing resource(s) 122 for establishing the first channel between the first bot 104 and the second bot 106.

At 604, the process 600 may receive a first response indicating that the first channel has been established. For example, the first bot 104 may receive an indication that the first channel has been established by the remote computing resource(s) 122 for purposes of the first bot 104 and the second bot 106 communicating.

At 606, the process 600 may cause a first message to be transmitted to the second bot. For example, after the first channel has been established, the first bot 104 and the second bot 106 may communicate with one another and exchange messages. The first bot 104 and the second bot 106 may communicate using a bot-to-bot communication protocol, such as natural language. For example, envision that the first bot 104 is a chatbot in communication with a user 102, but is unable to answer a query, question, or issue of the user 102. In such instances, the first bot 104 may initiate communication with the second bot 106, via the first channel, to resolve conflicts of the user 102 or otherwise assist the user 102 (e.g., scheduling appointments, confirming order(s), etc.). The API 118 of the first bot 104 and the API 120 of the second bot 106 may be configured to communicate using natural language. For example, both the first bot 104 and the second bot 106 may be bot(s) registered with the registry 128 and in turn, the first bot 104 and the second bot 106 may be capable of using natural language to communicate with one another. In this sense, messages may first be transmitted between the first bot 104 and the remote computing resource(s) 122 and then between the remote computing resource(s) 122 and the second bot 106. Acting as an interface between the first bot 104 and the second bot 106, the remote computing resource(s) 122 may permit communication between the first bot 104 and the second bot 106. In such instances, the API 118 of the first bot 104 and the API 120 of the second bot 106 may be configured to decipher and understand messages.

When the first bot 104 transmits the first message, the first bot 104 may call the API 118 to transmit or otherwise post the first message into the first channel. The API 118 may cause the first message to be posted or transmitted in natural language. The second bot 106 may receive the first message or may otherwise be made aware of the first message. For example, the second bot 106 may call the API 120 to receive the first message. The second bot 106 may intake the first message and understand a meaning and intent of the first message (e.g., what the first bot 104 is requesting help with, a task and/or assignment of the second bot 106, and so forth).

At 608, the first bot may receive a first response to the first message from the second bot. For example, the first bot 104 may receive, via the remote computing resource(s) 122 or over the first channel, the first response from the second bot 106. The first response may be associated with an answer, reply, and/or a confirmation of the first message. For example, in the event that the first message relates to scheduling a ride share for the user, the first response may be a confirmation that the ride share has been scheduled.

In some instances, after the first bot 104 receives the first response from the second bot 106, the remote computing resource(s) 122 may terminate the first channel. Alternatively, the first channel may remain open for allowing the first bot 104 and the second bot 106 to communicate.

At 610, the process 600 may cause a first reply to be presented to the user. For example, within the chat window 110, the first bot 104 may output an indication that the ride share has been scheduled for the user 102. In some instances, the response output to the user 102 may be the literal response from the second bot 106 or the first bot 104 may modify and/or reword the response that is output to the user 102.

At 612, the process 600 may transmit a second request to establish a second channel between the first bot and a third bot. For example, the first bot 104 may transmit a request to the remote computing resource(s) 122 for establishing the second channel between the first bot 104 and the third bot 206. The first bot 104 may engage with the third bot 206 for offering an expertise of third bot 206 to the user 102.

At 614, the process 600 may receive a second response indicating that the second channel has been established. For example, the first bot 104 may receive an indication from the remote computing resource(s) 122 that the second channel has been established for purposes of the first bot 104 and the third bot 206 communicating.

At 616, the process 600 may cause a second message to be transmitted to the third bot. For example, after the second channel has been established, the first bot 104 and the third bot 206 may communicate with one another and exchange messages. The first bot 104 and the third bot 206 may communicate using a bot-to-bot communication protocol, such as natural language. For example, the first bot 104 may engage or initiate a bot-to-bot communication protocol with the third bot 206 for assisting or aiding the user 102. The API 118 of the first bot 104 and an API of the third bot 206 may be configured to communicate using natural language. For example, both the first bot 104 and the third bot 206 may be bot(s) registered with the registry 128 and in turn, the first bot 104 and the third bot 206 may be capable of using natural language to communicate with one another. As part of this process, the remote computing resource(s) 122 may facilitate communications between the first bot 104 and the third bot 206.

When the first bot 104 transmits the second message, the first bot 104 may call the API 118 to transmit or otherwise post the second message into the second channel. The API 118 may cause the second message to be posted or transmitted in natural language. The third bot 206 may receive the second message from the remote computing resource(s) 122 or may otherwise be made aware of the second message. For example, the third bot 206 may call the API to receive the second message.

At 618, the process 600 may receive a first response to the second message from the third bot. For example, the first bot 104 may receive, via or over the second channel, the second response from the third bot 206. The second response may be associated with an answer, reply, and/or a confirmation of the second message. For example, in the event that the second message relates to the weather, the second response may be a response for the user 102 to bring an umbrella because the location of the user 102 or a destination of the user 102 is expected to be rainy.

In some instances, after the first bot 104 receives the second response from the third bot 206, the second channel may be terminated. Alternatively, the remote computing resource(s) 122 may keep the second channel open for allowing the first bot 104 and the third bot 206 to communicate. In some instances, as the first bot 104 may be designated as an admin bot (i.e., the bot requesting the channel), the first bot 104 may determine whether the channels are to be terminated or left open for future communication.

At 620, the process 600 may cause a second reply to be presented to the user. For example, within the chat window 110 on the device of the user 102, the first bot 104 may output a message such as "The weather in Seattle is expected to be rainy, so you may want to bring an umbrella."

Being as the first bot 104, the second bot 106, and/or the third bot 206 may communicate via natural language, more flexibility and scalability is provided. For example, rather than custom APIs being configured for allowing two bot(s) to communicate, the first bot 104, the second bot 106, and/or the third bot 206 may communicate using a common or standard language (i.e., natural language) and via channels established by the remote computing resource(s) 122. The APIs of the first bot 104, the second bot 106, and/or the third bot 206, as well as the API 152 of the remote computing resource(s) 122, may accordingly be configured to transmit messages using natural language and may decipher messages using NLU and NLP.

FIG. 7 illustrates an example process 700 for establishing a channel for bot and/or bot creators. In some instances, the process 700 may be performed by an application of the bot and/or the bot creator, a service of the bot, computing devices of the bot and/or the bot creator, and/or remote computing resources (e.g., the remote computing resource(s) 122).

At 702, the process 700 may receive a request from a first bot and/or a first bot creator to establish a channel. For example, the first bot 104 may transmit a request associated with establishing a channel in which the first bot 104 may communicate and collaborate with one or more additional bot(s) and/or bot creator(s). The remote computing resource(s) 122, for example, may receive the request from the first bot 104 to establish a channel. In some instances, the first bot 104 and/or the first bot creator 402 may be considered an initiating bot and/or initiating bot creator for establishing the channel.

At 704, the process 700 may determine whether the first bot and/or the first bot creator are registered and/or otherwise authorized to establish the channel. For example, the remote computing resource(s) 122 may determine whether the first bot 104 and/or first bot creator 402 have an account registered with the remote computing resource(s) 122 (i.e., within the registry 128) and/or are otherwise authorized to create channel(s) for collaborating with the one or more additional bot(s) and/or the bot creator(s). For example, some bot(s) and/or bot creator(s) may not be registered with the remote computing resource(s) 122, within the registry 128 and/or lack privileges and/or roles for establishing or otherwise moderating a channel. In some instances, the process 700 may also determine whether the one or more additional bot(s) and/or the bot creator(s) in which the first bot 104 and/or the first bot creator is attempting to collaborate with are registered and/or otherwise authorized. If the process 700 determines that the first bot 104 and/or the first bot creator 402 is not authorized (e.g., deny list, block list, etc.) to establish the channel, the process 700 may follow the "NO" route and proceed to 706.

At 706, the process 700 may refrain from allowing the first bot and/or the first bot creator to establish the channel. For example, the first bot 104 and/or the first bot creator 402 may not be registered with the remote computing resource(s) 122 and/or may be on a blacklist and not permitted to establish a channel for collaborating with the one or more additional bot(s) and/or the bot creator(s). In some instances, an indication of such may be output to the first bot 104 and/or the first bot creator 402. Alternatively, if at 704 the process 700 determines that the first bot 104 and/or the bot creator 402 is authorized, the process 700 may follow the "NO" route and proceed to 708.

At 708, the process 700 may authorize the channel to be created. In some instances, as part of authorizing the channel, the process 700 may generate a channel identification, an identification of the first bot 104 and/or the first bot creator 402, and/or a role of the first bot 104 and/or the first bot creator 402. Such information may be used when inviting the one or more additional bot(s) and/or the bot creator(s).

At 710, the process 700 may establish the channel. For example, the remote computing resource(s) 122 may establish the channel for allowing the first bot 104 and the second bot 106 to communicate. Additionally, or alternatively, one or more third-party services and/or resource(s) may be used for hosting or establishing the channel. As discussed above, the remote computing resource(s) 122 may host or otherwise provide computing resource(s) for the channel and/or allowing the first bot 104 and the second bot 106 to communicate. In some instances, the channel may provide mechanisms (e.g. passing an auth token via headers) to authenticate the user 102 for other bots invited to the channel. For example, the authentication of the user 102 may allow for the purchasing of goods and services from, or on behalf of, other bots.

At 712, the process 700 may transmit an invitation to one or more second bot(s) and/or one or more second bot creator(s) to join the channel. For example, as part of receiving the request from the first bot 104 and/or the first bot creator 402 at 702, the one or more second bot(s) and/or one or more second bot creator(s) may be identified. Therefore, once the first bot 104 and/or the first bot creator 402 are authorized, or permitted to request the establishment of the channel, the process 700 may transmit an invitation to the one or more second bot(s) and/or one or more second bot creator(s). In some instances, the first bot 104, the remote computing resource(s) 122 may transmit the invitation.

At 714, the process 700 may determine whether an indication is received that the second bot(s) and/or the second bot creator(s) have accepted the invitation. In some instances, certain bot(s) and/or bot creator(s) may choose to not collaborate with other bot(s) and/or bot creator(s), or may simply not accept the invite (e.g., workload). If at 714 the process 700 does not receive the indication, the process 700 may follow the "NO" route and proceed to 716.

At 16, the process 700 may transmit a first message to the first bot and/or the first bot creator. For example, in instances where the indication is not received, the first bot 104 and/or the first bot creator 402 may be notified that the second bot(s) and/or the second bot creator(s) did not accept the invitation and/or did not otherwise join the channel. In some instances, and in response, the first bot 104 and/or the first bot creator 402 may attempt to initiate a channel with one or more other bot(s) and/or bot creator(s). In some instances, the channel may not be created if the invites were not accepted.

Alternatively, if at 714 the process 700 receives the indication, the process 700 may follow the "YES" route and proceed to 718. At 718, the process 700 may transmit a second message to the first bot and/or the first bot creator. For example, in instances where the indication is received, the first bot 104 and/or the first bot creator 402 may be notified that the second bot(s) and/or the second bot creator(s) accepted the invitation and/or otherwise joined the channel. From there, the bot(s) and/or the bot creator(s) may collaborate and exchange messages for assisting users 102. For example, the first bot 104 and/or the first bot creator may forward a question of the user to the second bot(s) and/or the second bot creator(s).

Figure 8:
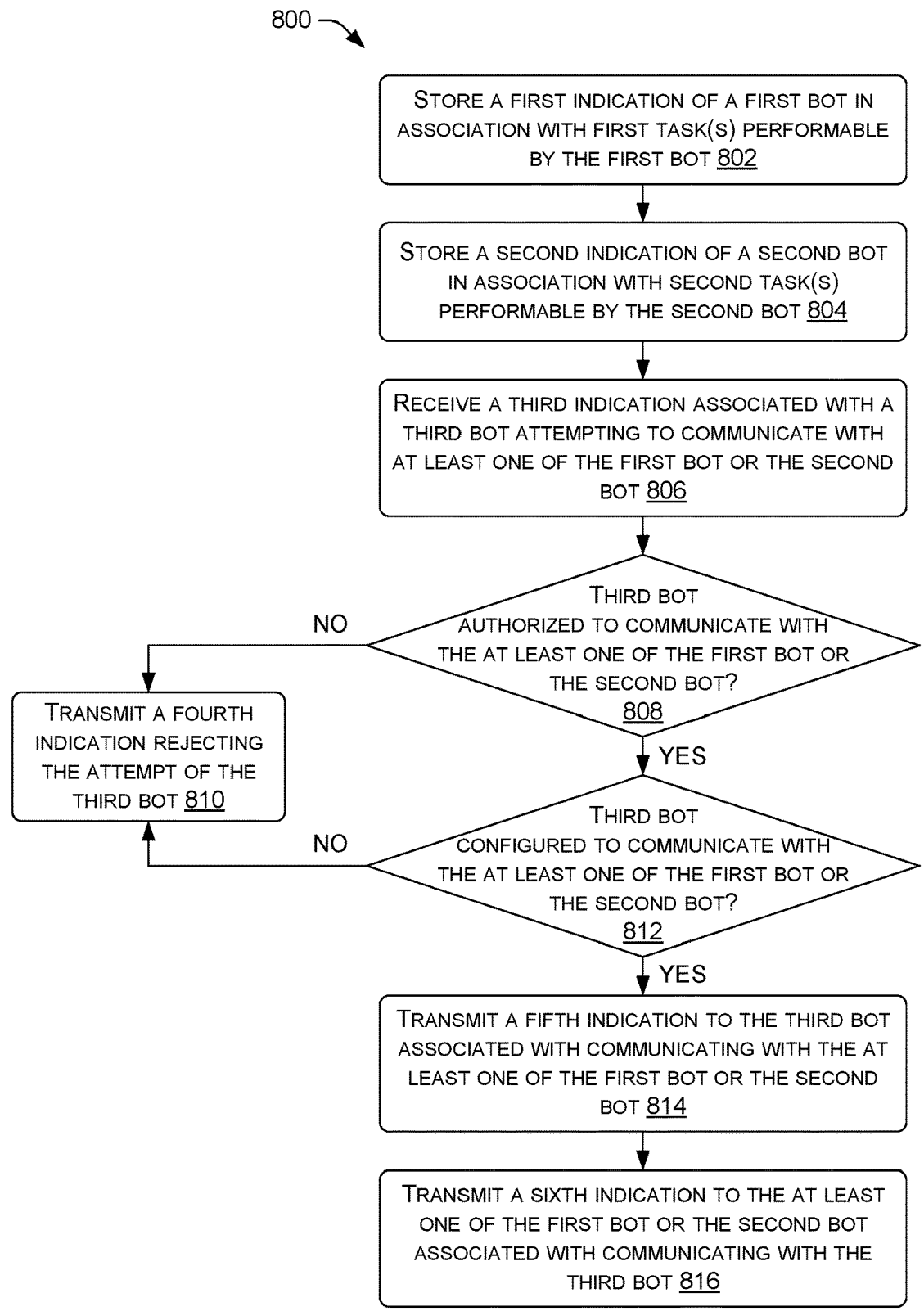
FIG. 8 illustrates an example process for facilitating a bot-to-bot channel, according to an embodiment of the present disclosure.

FIG. 8 illustrates an example process 800 for facilitating a bot-to-bot channel between one or more bot(s). Although the process 800 is described herein as being performed by the remote computing resource(s) 122, the process 800 may additionally, or alternatively, be performed by the first service 108 and/or the second service 116, or a service, platform, or system offering services of the bot(s).

At 802, the process 800 may store a first indication of a first bot in association with first task(s) performable by the first bot. For example, the remote computing resource(s) 122 may store an indication of the first bot 104 and the first task(s) 144 that the first bot 104 is configured to perform. The first bot 104, as well as the first task(s) 144, may be stored in the registry 128 and may be searchable by other bot(s) and/or bot creator(s) for purposes of locating and collaborating with the first bot 104.

At 804, the process 800 may store a second indication of a second bot in association with second task(s) performable by the second bot. For example, the remote computing resource(s) 122 may store an indication of the second bot 106 and the second task(s) 146 that the second bot 106 is configured to perform. The second bot 106, as well as the second task(s) 146, may be stored in the registry 128 and may be searchable by other bot(s) and/or bot creator(s) for purposes of locating and collaborating with the second bot 106.

At 806, the process 800 may receive a third indication associated with a third both attempting to communicate with at least one of the first bot or the second bot. For example, the third bot 206 may be attempting to collaborate with at least one of the first bot 104 and/or the second bot 106 over one or more channel(s). In such instances, the remote computing resource(s) 122 may field or receive the request and/or act as a moderator to determine whether the third bot 206 may communicate with the first bot 104 and/or the second bot 106.

At 808, the process 800 may determine whether the third bot is authorized to communicate with the ate least one of the first bot or the second bot. For example, the remote computing resource(s) 122 may determine whether the third bot 206 is on a block list, is able to initiate bot-to-bot communication channels, whether the third bot 206 has a valid token, whether the third bot 206 is registered with the remote computing resource(s) 122 and in the registry 128, etc. In this sense, the remote computing resource(s) 122 may authorize or authenticate bot(s) wanting to have access to or communicate with those bot(s) stored in the registry 128. Additionally, the remote computing resource(s) 122 may validate those requests before establishing the bot-to-bot communication channel(s).

If at 808 the process 800 determines that the third bot is not authorized, the process 800 may follow the "NO" route and proceed to 810. At 810, the process 800 may transmit a fourth indication that rejects the attempt of third bot to communicate with the at least one of the first bot or the second bot. For example, the remote computing resource(s) 122 may transmit an error message to the third bot 206 indicating that the third bot 206 may not communicate with the first bot 104 and/or the second bot 106, rejecting the attempt, or is not otherwise authorized to communicate with the first bot 104 and/or the second bot 106.

Alternatively, if at 808 the process 800 determines that the third bot is authorized, the process 800 may follow the "YES" route and proceed to 812. At 812, the process 800 may determine whether the third bot is configured to communicate with the first bot and/or the second bot. For example, the remote computing resource(s) 122 may determine whether the third bot 206 has an appropriate API for communicating in natural language with the first bot 104, the second bot 106, and/or the remote computing resource(s) 122. As part of this step, the remote computing resource(s) 122 may additionally, or alternatively, determine whether the first bot 104 and/or the second bot 106 have appropriate APIs (e.g., the API 118 and the API 120, respectively) for communicating with the third bot 206 using natural language.

If at 812 the process 800 determines that the third bot is not configured to communicate with the at least one of the first bot or the second bot, the process 800 may follow the "NO" route and proceed to 810. At 810, the process 800 may reject the attempt of third bot to communicate with the at least one of the first bot or the second bot. In some instances, the fourth indication may indicate that the third bot 206 is not configured with an appropriate API for communicating with the first bot 104 and/or the second bot 106. In some instances, the fourth indication may indicate that the first bot 104 and/or the second bot 106 are not configured to communicate with APIs and using natural language.

Alternatively, if at 812 the process 800 determines that the third bot is configured to communicate, the process 800 may follow the "YES" route and proceed to 814. At 814, the process 800 may transmit a fifth indication to the third bot associated with communicating with the at least one of the first bot or the second bot. For example, the fifth indication may include an indication that the third bot 206 may communicate and is configured to communicate with the first bot 104 and/or the second bot 106. The indication may also indicate an establishment of the bot-to-bot communication channel via the remote computing resource(s) 122 and/or identifiers of the first bot 104 and/or the second bot 106. From here, the third bot 206 may establish or initiate communication with the first bot 104 and/or the second bot 106.

At 816, the process 800 may transmit a sixth indication to the at least one of the first bot or the second bot associated with communicating with the third bot. The sixth indication may include an identifier of the third bot 206 to allow the first bot 104 and/or the second bot 106 to communicate with the third bot 206. In some instances, the sixth indication may include an invitation to join the bot-to-bot communication channel, and upon receipt, the first bot 104 and/or the second bot 106 may choose whether to accept or deny the invitation.

In some instances, the process 800 may generate tokens for the first bot 104, the second bot 106, and/or the third bot 206 for purposes of authenticating the communication with one another. When the first bot 104, the second bot 106, and/or the third bot 206 attempt to communicate with one another, or attempt to join the bot-to-bot channel, the remote computing resource(s) 122 may compare the tokens with a database to determine whether the tokens are valid, have not expired, and so forth. This may ensure the privacy of the bot-to-bot communication protocol.

Figure 9:
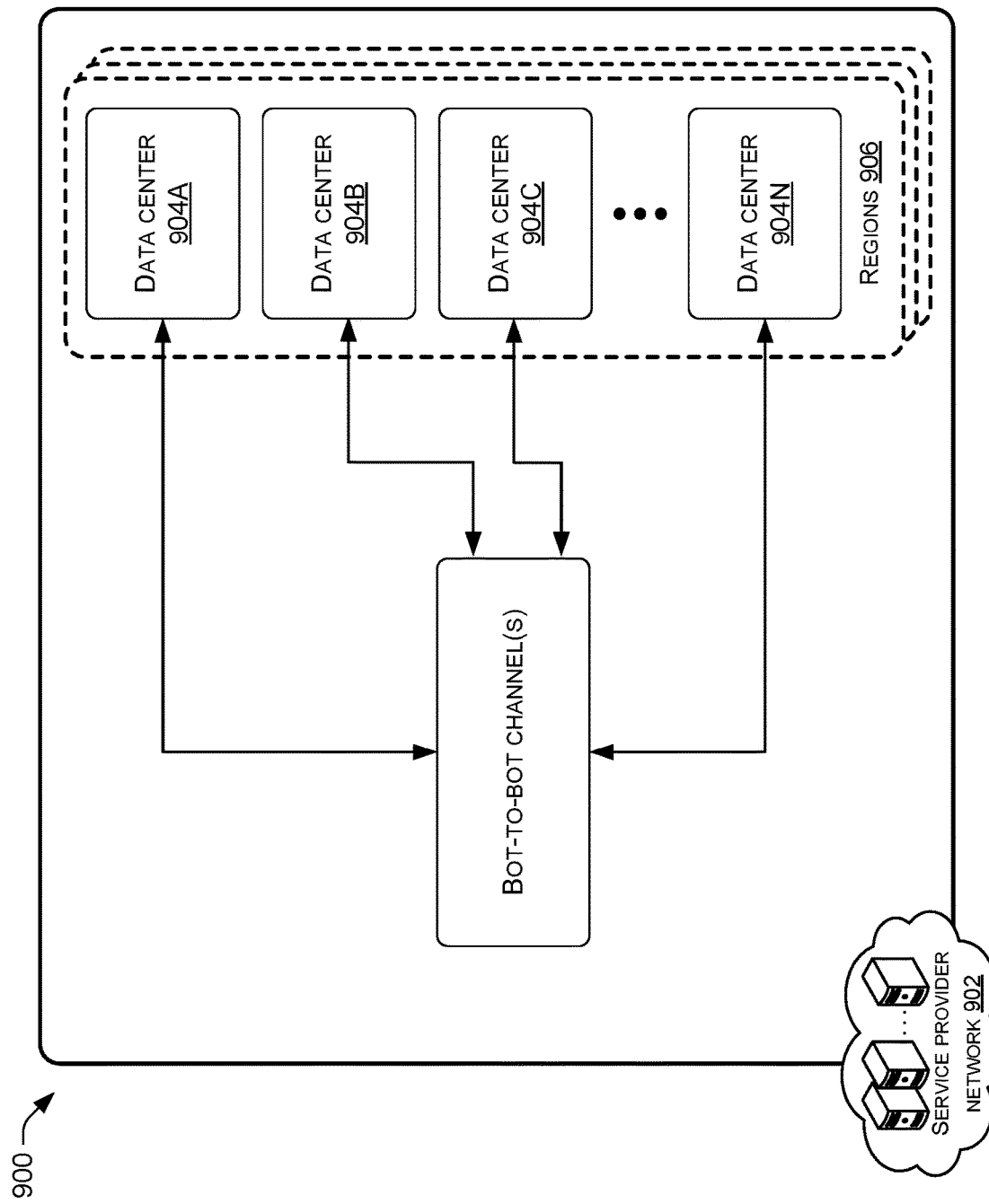
FIG. 9 illustrates an example system and network diagram that shows an operating environment including a service provider network that may be configured to implement aspects of the functionality described herein, according to an embodiment of the present disclosure.

FIG. 9 is a system and network diagram that shows an illustrative operating environment 900 that includes a service provider network 902. The service provider network 902 may be configured to implement aspects of the functionality described herein, such as storing or having access to the registry 128, hosting user-to-bot channel(s) (e.g., the first channel 112), and/or hosting bot-to-bot channel(s) (e.g., the second channel 114), as discussed above. In some instances, the service provider network 902 may correspond to the first service 106 or the second service 116 that offer services of the first bot 104 and the second bot 106, respectively. The service provider network 902 may alternatively correspond to the remote computing resource(s) 122.

The service provider network 902 may provide computing resources, like virtual machine (VM) instances and storage, on a permanent or an as-needed basis. The computing resources provided by the network service provider 902 may include data processing resources, data storage resources, networking resources, data communication resources, network services, and the like. Among other types of functionality, the computing resources provided by the service provider network 902 may be utilized to implement the various services and components described above.

Each type of computing resource provided by the service provider network 902 may be general-purpose or may be available in a number of specific configurations. For example, data processing resources may be available as physical computers or VM instances in a number of different configurations. The VM instances may be configured to execute applications, including web servers, application servers, media servers, database servers, gaming applications, and/or other types of programs. Data storage resources may include file storage devices, block storage devices, and the like. The service provider network 902 may also be configured to provide other types of computing resources not mentioned specifically herein.

The computing resources provided by the service provider network 902 may be enabled in one embodiment by one or more data centers 904A-904N (which might be referred to herein singularly as "a data center 904" or in the plural as "the data centers 904"). The data centers 904 are facilities utilized to house and operate computer systems and associated components. The data centers 904 typically include redundant and backup power, communications, cooling, and security systems. The data centers 904 may also be located in geographically disparate locations, or regions 906. One illustrative embodiment for a data center 904 that may be utilized to implement the technologies disclosed herein will be described below with regard to FIG. 10.

The service provider network 902 may be made available to consumers (e.g., business, entities, individuals, etc.) for accessing the computing resources provided by the service provider network 902 over any wired and/or wireless network(s), which may be a wide area communication network ("WAN"), such as the Internet, an intranet or an Internet service provider ("ISP") network or a combination of such networks. It should be appreciated that a local-area network ("LAN"), the Internet, or any other networking topology known in the art that connects the data centers 604 to remote clients and other users may be utilized. It should also be appreciated that combinations of such networks may also be utilized. In some instances, the bot(s) and their respective programming and/or application may be offered as a service by the service provider network 902, which may manage the deployment of computing resources of the service provider network 902.

FIG. 10 is a computing system diagram 1000 that illustrates one configuration for the data center 904 that implements aspects of the technologies disclosed herein. The example data center 904 shown in FIG. 10 includes several server computers 1002A-1002F (which might be referred to herein singularly as "a server computer 1002" or in the plural as "the server computers 1002") for providing computing resources 1004A-1004E.

The server computers 1002 may be standard tower, rackmount, or blade server computers configured appropriately for providing the computing resources described herein (illustrated in FIG. 10 as the computing resources 1004A-1004E). The computing resources provided by the service provider network 902 may be data processing resources such as VM instances or hardware computing systems, database clusters, computing clusters, storage clusters, data storage resources, database resources, networking resources, and others. Some of the server computers 1002 may also be configured to execute a resource manager 1006 capable of instantiating and/or managing the computing resources. In the case of VM instances, for example, the resource manager 1006 may be a hypervisor or another type of program configured to enable the execution of multiple VM instances on a single server computer 1002. Server computers 1002 in the data center 904 may also be configured to provide network services and other types of services.

In the example data center 904 shown in FIG. 10, an appropriate LAN 1008 is also utilized to interconnect the server computers 1002A-1002F. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between each of the data centers 904A-904N, between each of the server computers 1002A-1002F in each data center 904, and, potentially, between computing resources in each of the server computers 1002. It should be appreciated that the configuration of the data center 904 described with reference to FIG. 10 is merely illustrative and that other implementations may be utilized.

The data center 904 shown in FIG. 10 also includes a server computer 1002F that may execute some or all of the software components described above. For example, and without limitation, the server computer 1002F (and the other server computers 1002) may generally correspond to a server/computing device configured to execute components including, without limitation, offering services of the first bot 104 (e.g., hosting an application associated with the first bot 104), offering services of the second bot 106 (e.g., hosting an application associated with the second bot 106), hosting the registry 128, hosting/establishing the bot-to-bot channels, and/or the other software components described above. The server computer 1002F may also be configured to execute other components and/or to store data for providing some or all of the functionality described herein. In this regard, it should be appreciated that the components illustrated in FIG. 10 as executing on the server computer 1002F may execute on many other physical or virtual servers in the data centers 904 in various embodiments. Thus, the data center 904 in FIG. 10 may also include a plurality of server computers 1002 that execute a fleet of VM instances.

While various examples and embodiments are described individually herein, the examples and embodiments may be combined, rearranged, and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The invention claimed is:

1. A method comprising:
receiving, from a first bot, a request to establish a bot-to-bot channel with a second bot, wherein the first bot comprises a chatbot that is engaged in a conversation with a user over a bot-to-human channel;
determining that the first bot is authorized to request the bot-to-bot channel based on the first bot being registered within a registry associated with authorized bots;
determining, among a plurality of bots within the registry, that the second bot is capable of performing a second task, the second task being associated with a first task performed by the first bot, wherein individual bots of the plurality of bots are stored in association with performable tasks;
establishing the bot-to-bot channel between the first bot and the second bot, wherein the first bot and the second bot are configured to communicate using natural language over the bot-bot-channel;
sending an invitation to the second bot associated with joining the bot-to-bot channel;

receiving, from the second bot, an indication indicating that the second bot joined the bot-to-bot channel;

receiving, from the first bot, a first indication of the second task to be performed by the second bot;

sending, to the second bot, a second indication associated with the second task;

receiving a response associated with the second bot performing the second task; and sending, to the first bot, a third indication associated with second bot performing the second task, wherein the first bot causes an output associated with the second task on a device of the user.

2. The method of claim 1, wherein:

the first bot includes a first application programming interface (API) that is configured to communicate with at least the second bot using natural language; and the second bot includes a second API that is configured to communicate with at least the first bot using natural language.

3. The method of claim 1, further comprising:

sending an additional invitation to be sent to at least one of a first bot creator associated the first bot or a second bot creator associated with the second bot, the additional invitation associated with joining the bot-to-bot channel;

receiving a second indication indicating that the at least one of the first bot creator or the second bot creator joined the bot-to-bot channel; and receiving, from the at least one of the first bot creator or the second bot creator, a second response that is associated with the second bot performing the second task, wherein the second bot is configured to utilize the second response for performing the second task.

4. The method of claim 1, further comprising:

receiving, from the first bot, a second request to terminate the bot-to-bot channel; and based at least in part on receiving the second request, causing the bot-to-bot channel to terminate.

5. The method of claim 1, further comprising:

determining, among the plurality of bots within the registry, a third bot capable of assisting in performing the second task; and causing an additional invitation to be sent to the third bot, the additional invitation associated with joining the bot-to-bot channel, wherein the first bot, the second bot, and the third bot are configured to communicate within the bot-to-bot channel using natural language.

6. A method comprising:

receiving, from a first bot associated with a first service, a first request to establish a bot-to-bot channel with a second bot associated with a second service that is different than the first service;

determining that the first bot is authorized to request establishment of the bot-to-bot channel;

determining that the first bot has a first application programming interface (API) configured to communicate over the bot-to-bot channel with the second bot in natural language;

determining that the second bot has a second API configured to communicate over the bot-to-bot channel with the first bot in natural language;

causing the bot-to-bot channel to be established between the first bot and the second bot; and causing an invitation to be sent to the second bot, the invitation associated with joining the bot-to-bot channel.

7. The method of claim 6, further comprising:

storing a first indication of the first bot in association with one or more first tasks performable by the first bot; and storing a second indication of the second bot in association with one or more second tasks performable by a second bot.

8. The method of claim 6, further comprising:

causing a first message to be sent from the first bot to the second bot over the bot-to-bot channel;

causing a second message to be sent from the second bot to the first bot over the bot-to-bot channel; and storing the first message and the second message in association with the bot-to-bot channel.

9. The method of claim 6, further comprising:

receiving, from at least one of the first bot or the second bot, a second request to establish a second bot-to-bot channel with a third bot; and causing the bot-to-bot channel to be established between the at least one of the first bot or the second bot and the third bot.

10. The method of claim 6, wherein the first bot is configured to communicate with a user over a bot-to-human channel established between the first bot and a device of the user.

11. The method of claim 10, wherein the first bot is configured to receive inquiries of the user and respond to the inquiries of the user by performing one or more actions.

12. The method of claim 6, wherein:

the first bot is configured to perform first tasks and respond to first inquires; and the second bot is configured to perform second tasks that are different than the first tasks and respond to second inquiries that are different than the first inquiries.

13. The method of claim 6, wherein:

the first bot is at least one of:
associated with a first application; or
developed by a first bot creator; and the second bot is at least one of:
associated with a second application that is different than the first application; or
developed by a second bot creator that is different than the first bot creator.

14. A system comprising:

one or more processors; and one or more non-transitory computer-readable media storing instructions that, when executed, cause the one or more processors to perform acts comprising:

receiving, from a first bot associated with a first service, a request to establish a channel between the first bot and a second bot associated with a second service that is different than the first service, wherein the first bot is in communication with a device of a user;

determining that the first bot is authorized to request establishment of the channel;

determining that the first bot and the second bot are configured to communicate using natural language;

causing, based at least in part on determining that the first bot and the second bot are configured to communicate using natural language, the channel to be established; and causing an invitation to be sent to the second bot for joining the channel.

15. The system of claim 14, wherein the first bot is configured to perform a first task, the acts further comprising:

receiving, from the first bot, a first indication associated with a second task to be performed by the second bot, the second task being associated with the first task;

transmitting, to the second bot, a second indication associated with the second task;

receiving, from the second bot, a third indication associated with a first response to the second task; and sending, to the first bot, a fourth indication of the first response to the second task, wherein the first bot is configured to output a second response associated with the second task.

16. The system of claim 15, the acts further comprising determining that the second bot is configured to perform the second task, wherein causing the channel to be established is based at least in part on determining that the second bot is configured to perform the second task.

17. The system of claim 14, wherein:
the first bot includes a first application programming interface (API) that is configured to communicate with at least the second bot using natural language; and
the second bot includes a second API that is configured to communicate with at least the first bot using natural language.

18. The system of claim 14, the acts further comprising terminating the channel between the first bot and the second bot.

19. The system of claim 14, wherein:
the first bot is at least one of:
associated with a first application; or
developed by a first bot creator; and
the second bot is at least one of:
associated with a second application that is different than the first application; or
developed by a second bot creator that is different than the first bot creator.

20. The system of claim 14, further comprising:
causing a first message to be sent from the first bot to the second bot over the channel;
causing a second message to be sent from the second bot to the first bot over the channel; and
storing the first message and the second message in association with the channel.

\* \* \* \* \*